US008115737B2

(12) United States Patent
Oba et al.

(10) Patent No.: US 8,115,737 B2
(45) Date of Patent: Feb. 14, 2012

(54) INFORMATION PROCESSING APPARATUS, INFORMATION PROCESSING METHOD, INFORMATION PROCESSING SYSTEM AND INFORMATION PROCESSING PROGRAM

(75) Inventors: Haruo Oba, Kanagawa (JP); Atsushi Koshiyama, Tokyo (JP)

(73) Assignee: Sony Corporation (JP)

( * ) Notice: Subject to any disclaimer, the term of this patent is extended or adjusted under 35 U.S.C. 154(b) by 178 days.

(21) Appl. No.: 12/589,672

(22) Filed: Oct. 27, 2009

(65) Prior Publication Data

US 2010/0127989 A1  May 27, 2010

(30) Foreign Application Priority Data

Nov. 25, 2008 (JP) ................. P2008-299407

(51) Int. Cl.
*G06F 3/02* (2006.01)
*G09G 5/00* (2006.01)
(52) U.S. Cl. .......... 345/168; 345/173; 345/174; 341/22; 341/33
(58) Field of Classification Search .......... None
See application file for complete search history.

(56) References Cited

U.S. PATENT DOCUMENTS

| 5,923,267 | A * | 7/1999 | Beuk et al. ................. 340/5.54 |
| 6,204,839 | B1 * | 3/2001 | Mato, Jr. ..................... 345/168 |
| 6,288,707 | B1 * | 9/2001 | Philipp ......................... 345/168 |
| 7,659,887 | B2 * | 2/2010 | Larsen et al. ................. 345/170 |
| 2006/0232557 | A1 * | 10/2006 | Fallot-Burghardt .......... 345/168 |
| 2008/0042978 | A1 * | 2/2008 | Perez-Noguera ............. 345/168 |
| 2008/0122798 | A1 | 5/2008 | Koshiyama et al. |
| 2008/0278450 | A1 * | 11/2008 | Lashina ....................... 345/173 |

FOREIGN PATENT DOCUMENTS

| JP | 2007-219676 A | 8/2007 |
| JP | 2008-117371 A | 5/2008 |

* cited by examiner

*Primary Examiner* — Richard Hjerpe
*Assistant Examiner* — Christopher Thompson
(74) *Attorney, Agent, or Firm* — Lerner, David, Littenberg, Krumholz & Mentlik, LLP

(57) ABSTRACT

An information processing apparatus includes: a key operation section that has one or more operation keys arranged planarly, and outputs a key operation output corresponding to an operation of an operation key; a sensor that outputs a detection output corresponding to a distance of a detection target, spatially separated from a layout surface of the operation key, from the layout surface; a detection section that detects the distance of the detection target from the layout surface from the detection output from the sensor; and a control section that validates only the key operation output corresponding to the operation of the operation key and invalidates the detection output of the sensor when the detected distance is less than a predetermined distance, and executes a control function according to the distance detected by the detection section when the detected distance is equal to or greater than the predetermined distance.

14 Claims, 25 Drawing Sheets

X-Z SENSOR PANEL

Y-Z SENSOR PANEL

FIG.10

207 LAYER INFORMATION STORAGE SECTION

| | LAYER | BASIC FUNCTION SELECTION | DRAG (ROTATE/MOVE) | SELECT FILE | MAGNIFY/REDUCE |
|---|---|---|---|---|---|
| SELECTION AREA | LAYER C1 | CONFIRM SELECTED FUNCTION | CONFIRM DRAGGING POSITION, AND EXECUTE DRAGGING | CONFIRM SELECTED IMAGE FILE | MAGNIFY/REDUCE FAST SPEED |
| SELECTION AREA | LAYER C2 | SELECT BASIC FUNCTION (X-Y DIRECTIONAL OPERATION) | SELECT DRAGGING POSITION (X-Y DIRECTIONAL OPERATION) | SELECT IMAGE FILE (X-Y DIRECTIONAL OPERATION) | MAGNIFY/REDUCE SLOW SPEED |
| DECISION AREA | LAYER D1 | DECIDED | | | |
| DECISION AREA | LAYER D2 | UNDECIDED | | | |

MOVE

ROTATE

LAYER K1

LAYER K2

LAYER K3

DECISION OPERATION

DECISION OPERATION

LAYER INFORMATION STORAGE SECTION

| LAYER S1 | PLAYER'S VIEWPOINT |
|---|---|
| LAYER S2 | PARTIAL MAP DOWNWARD VIEWPOINT FROM MIDDLE POINT |
| LAYER S3 | OVERALL MAP DOWNWARD VIEWPOINT FROM ABOVE |

INFORMATION PROCESSING APPARATUS, INFORMATION PROCESSING METHOD, INFORMATION PROCESSING SYSTEM AND INFORMATION PROCESSING PROGRAM

CROSS-REFERENCE TO RELATED APPLICATION

The present application claims priority from Japanese Patent Application JP 2008-299407 filed in the Japanese Patent Office on Nov. 25, 2008, the entire content of which is hereby incorporated by reference.

BACKGROUND OF THE INVENTION

1. Field of the Invention

The present invention relates to an information processing apparatus, information processing method, information processing system and information processing program that perform control according to, for example, a key input or the like made by a user.

2. Description of the Related Art

In the past, a person generally uses an operation button or a touch panel in making some input. A touch panel is combined with a flat display, such as an LCD (Liquid Crystal Display), so that an operational input is made as if button icons or so displayed on the display screen were depressed.

Such an input operation is premised on contacting with or pressing the flat surface of an operation button top or the screen of the touch panel. Accordingly, the limited operation, namely contacting with or pressing the flat surface, is an operational input. In addition, the technique is limited to an application which enables contact with a flat surface.

This has raised problems such that contact- or pressure-caused vibration or force interferes with the performance of the device, and stains or damages the contact surface.

As an improvement on those problems, a proximity detection information display apparatus is disclosed in Patent Document 1 (JP-A-2008-117371) by the present applicant. Patent Document 1 describes the use of a sensor with a sensor panel which has a plurality of line electrodes or point electrodes arranged in, for example, two orthogonal directions.

The sensor detects the distance between the sensor panel surface containing a plurality of electrodes and a detection target spatially separated from the panel surface, e.g., a human hand or finger, by detecting a capacitance corresponding to the distance for those electrodes.

That is, the capacitance between each of a plurality of electrodes of the sensor panel and the ground changes according to the spatially separated distance between the position of a human hand or finger and the panel surface. In this respect, a threshold value is set for the spatial distance between the position of a human hand or finger and the panel surface, and it is detected if the finger has moved closer to or away from the panel than that distance by detecting a change in capacitance corresponding to the distance.

Patent Document 1 discloses a technique capable of enhancing the sensitivity of detecting the capacitance by changing the interval between electrodes which detect the capacitance according to the distance between the detection target and the sensor panel surface.

According to the preceding technique proposed, a switch input can be made without touching the sensor panel. Because the sensor panel has a plurality of line electrodes or point electrodes arranged in two orthogonal directions, the motion of a hand or a finger in a direction along the panel surface can be detected spatially, bringing about a characteristic such that an operational input according to the motion of the hand or finger within the space can also be made.

SUMMARY OF THE INVENTION

An input section using the sensor disclosed in JP-A-2008-117371 (Patent Document 1) is not suitable as a section for inputting characters, such as a keyboard. It is therefore conceivable to connect a keyboard and an input section using the sensor disclosed in Patent Document 1 to an information processing apparatus, such as a personal computer, and perform an operation with the two kinds of input sections selectively used according to their usages.

It is however troublesome to perform an operation with the selected input sections. Another problem is the necessity of connecting two kinds of input sections to an information processing apparatus, such as a personal computer (hereinafter abbreviated as "PC"). There is a further problem such that it is difficult to perform a cooperative operation using both input sections.

It is therefore desirable to provide an information processing apparatus and method which can overcome the above problems.

According to an embodiment of the invention, there is provided an information processing apparatus including:

a key operation section that has one or more operation keys arranged planarly, and outputs a key operation output corresponding to an operation of an operation key;

a sensor that outputs a detection output corresponding to a distance of a detection target, spatially separated from a layout surface of the operation key of the key operation section, from the layout surface;

a detection section that detects the distance of the detection target from the layout surface from the detection output from the sensor; and a control section that validates only the key operation output corresponding to the operation of the operation key and invalidates the detection output of the sensor when the distance detected by the detection section is less than a predetermined distance, and executes a control function according to the distance detected by the detection section when the detected distance is equal to or greater than the predetermined distance.

In the thus configured information processing apparatus according to the embodiment of the invention, the detection section detects the distance of the detection target from the key layout surface of the key operation section from the detection output from the sensor, and the control section decides that an input operation for an operation key arranged at the key operation section is valid when the distance of the detection target from the key layout surface of the key operation section, which is detected by the detection section, is less than a predetermined distance.

When the distance of the detection target from the key layout surface of the key operation section, which is detected by the detection section, is equal to or greater than the predetermined distance, the control section executes a control function according to the distance of the detection target detected by the detection section.

The following takes place in case of assuming a human hand or finger as an example of a detection target.

When a user operates an operation key, arranged on the key layout surface, with a hand or finger, the distance of the user's hand or finger from the key layout surface is less than a predetermined distance. Accordingly, the control section decides that an input operation for an operation key arranged at the key operation section is valid, and performs a control process according to the operation key.

When a user operates an operation key, arranged on the key layout surface, with a hand or finger, the distance of the user's hand or finger from the key layout surface is equal to or greater than the predetermined distance, on the other hand, the control section decides that the user has made a spatial input operation, and performs a control function according to the distance of the user's hand or finger from the key layout surface.

In this manner, the user can perform an input operation with operation keys and a spatial input operation over the key layout surface with the user's hand placed over the key layout surface, which is very convenient.

According to the embodiment of the invention, it is possible to provide an information processing apparatus capable of executing control according to two kinds of input operations, namely, an input operation with operation keys arranged on the key layout surface and a spatial input operation over the key layout surface. In this case, according to the invention, the user can perform an input operation with the operation keys and a spatial input operation over the key layout surface with the user's hand placed over the key layout surface, which is very convenient.

BRIEF DESCRIPTION OF THE DRAWINGS

FIG. 10 is a diagram for explaining the correlation between layers according to distances to a detection target from the sensor in the operation input apparatus in the embodiment of the information processing system according to the invention, and functions to be assigned to the layers;

DETAILED DESCRIPTION OF THE PREFERRED EMBODIMENTS

One embodiment of an information processing apparatus according to the present invention will be described below with reference to the accompanying drawings. In the embodiment to be described below, a sensor in use is the sensor that is disclosed in Patent Document 1 to sense a capacitance to detect a distance to a detection target. The detection target is assumed to be a hand or a finger of an operator.

First Embodiment

Figure 3:
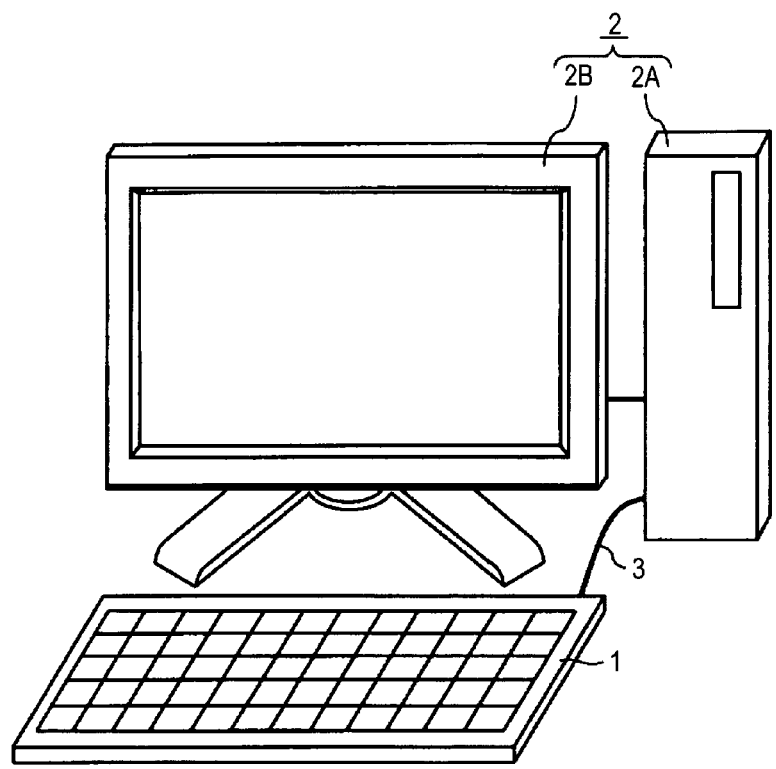
FIG. 3 is a diagram showing an example of the hardware configuration of the embodiment of the information processing system according to the invention.

A first embodiment is an embodiment of an information processing system including an operation input apparatus and an information processing apparatus. FIG. 3 is a diagram showing an example of the configuration of the information processing system as the first embodiment.

As shown in FIG. 3, the information processing system according to the embodiment includes an operation input apparatus 1 and a personal computer (PC) 2 as an information processing apparatus. The operation input apparatus 1 is connected to a PC body 2A by a connection cable 3. The PC body 2A connected with a display unit 2B which is, for example, an LCD (Liquid Crystal Display).

In this example, a keyboard 11 having a plurality of operation keys arranged thereon is disposed on the surface portion of the operation input apparatus 1. As a user presses an operation key on the keyboard 11, the operation input apparatus 1 outputs a key operation output according to the pressed operation key.

In the operation input apparatus 1 according to the embodiment, a sensor section 10 that detects a spatially separated distance of a hand or finger as a detection target is disposed under the keyboard 11, which is not shown in FIG. 3.

The sensor section 10 outputs a sensor detection output corresponding to the spatially separated distance of a hand or finger as the detection target to the sensor section 10. As will be described later, according to the embodiment, the sensor section 10 has a rectangular sensor panel with a two-dimensional surface of a predetermined size, and detects a distance to the detection target from the surface of the sensor panel.

According to the embodiment, the sensor section 10 is configured to be able to independently output sensor detection outputs corresponding to distances to the detection target at a plurality of positions in each of the horizontal and vertical directions of the sensor panel surface. According to the embodiment, therefore, the sensor section 10 can also detect where on the sensor panel surface the detection target is located.

That is, given that the horizontal direction and vertical direction of the sensor panel surface are an x-axial direction and a y-axial direction, respectively, and a direction orthogonal to the sensor panel surface is a z-axial direction, the spatially separated distance of the detection target is detected as the value of the z-axial coordinate. The spatial distance of the detection target on the sensor panel is detected by the values of the x-axial coordinate and the y-axial coordinate.

According to the embodiment, the PC body 2A accepts a key operation output corresponding to a pressed operation key on the keyboard 11 of the operation input apparatus 1, and a sensor detection output from the sensor section 10. The sensor detection output from the sensor section 10 corresponds to a position on the sensor panel surface of the detection target (x and y coordinates) and a spatially separated distance (z coordinate).

According to the embodiment, the PC body 2A monitors both input information of a key operation output from the operation input apparatus 1 and a sensor detection output, and executes control according to both of the detected input information. According to the embodiment, the control result is specifically displayed on the screen of the display unit 2B.

<Description of the Configuration of the Operation Input Apparatus 1 According to the First Embodiment>

Figure 1:
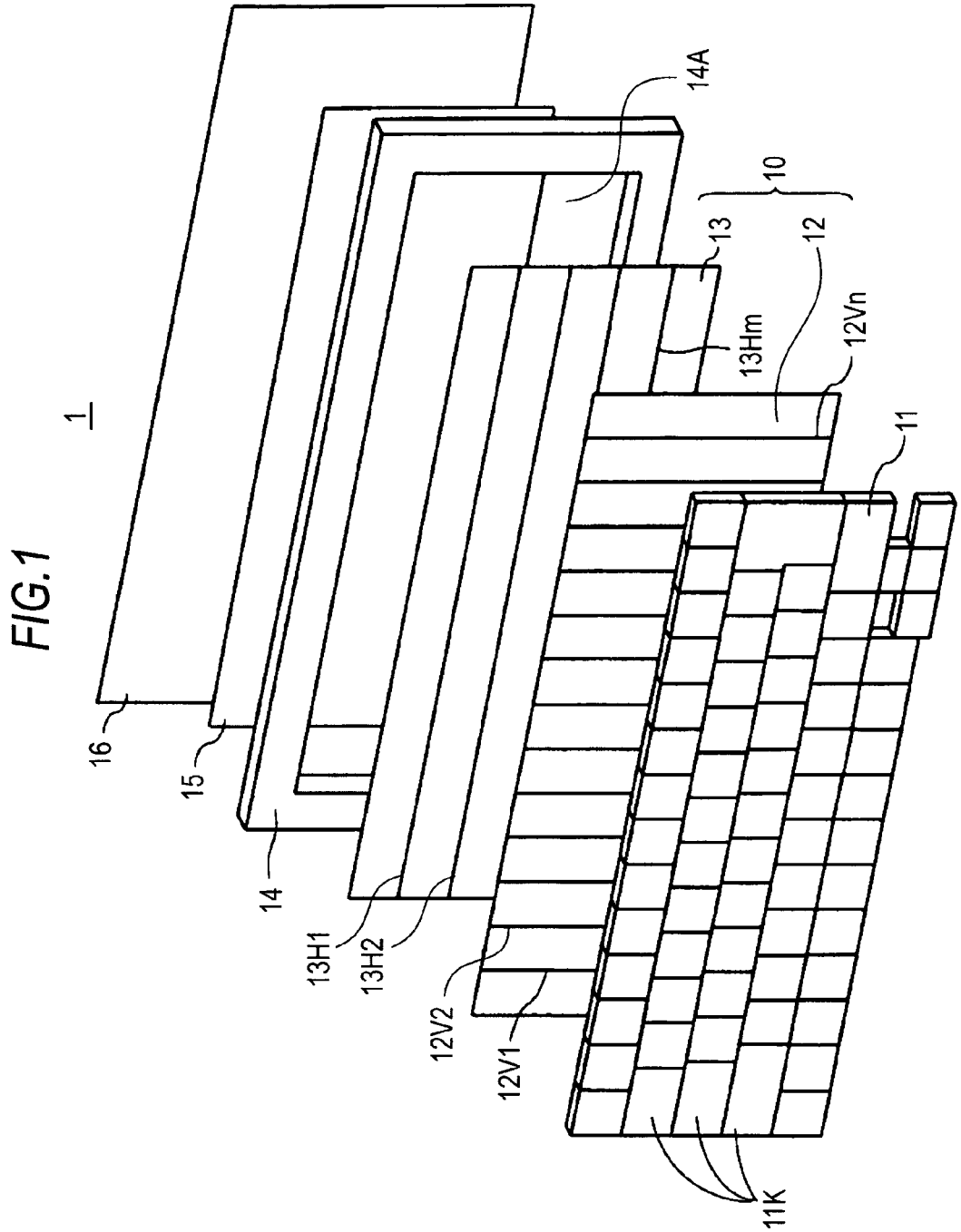
FIG. 1 is an exploded perspective view showing an example of the configuration of an operation input apparatus to be used in an embodiment of an information processing system according to the present invention.

FIG. 1 shows an exploded configurational diagram of the operation input apparatus 1 according to the embodiment. The operation input apparatus 1 according to the embodiment has a laminated structure of the keyboard 11 and the sensor section 10.

That is, as shown in FIG. 1, the keyboard 11, an X-Z sensor panel 12, a Y-Z sensor panel 13, an outer peripheral frame 14, a keyboard printed wiring board 15, and a rear-side frame 16 provided in order in the depth direction (operation-key depression direction) from the front side in the operation direction of the operation input apparatus 1.

As is well known, the keyboard 11 has a plurality of operation keys 11K arranged planarly in the vertical direction and the horizontal direction. When each of the operation keys 11K of the keyboard 11 is pressed, a corresponding one of depression detection switches provided at the keyboard printed wiring board 15 in association with the operation keys 11K is turned on.

The keyboard printed wiring board 15 outputs a key operation output corresponding to the position of the depression detection switch which is set on according to the pressed operation key 11K. The PC body 2A detects, from the key operation output, if any operation key 11K is pressed.

The X-Z sensor panel 12 and the Y-Z sensor panel 13 constitute the sensor section 10 according to the embodiment. The X-Z sensor panel 12 and the Y-Z sensor panel 13 are each formed by arranging a plurality of wire electrodes in two orthogonal directions in this example.

Figure 2:
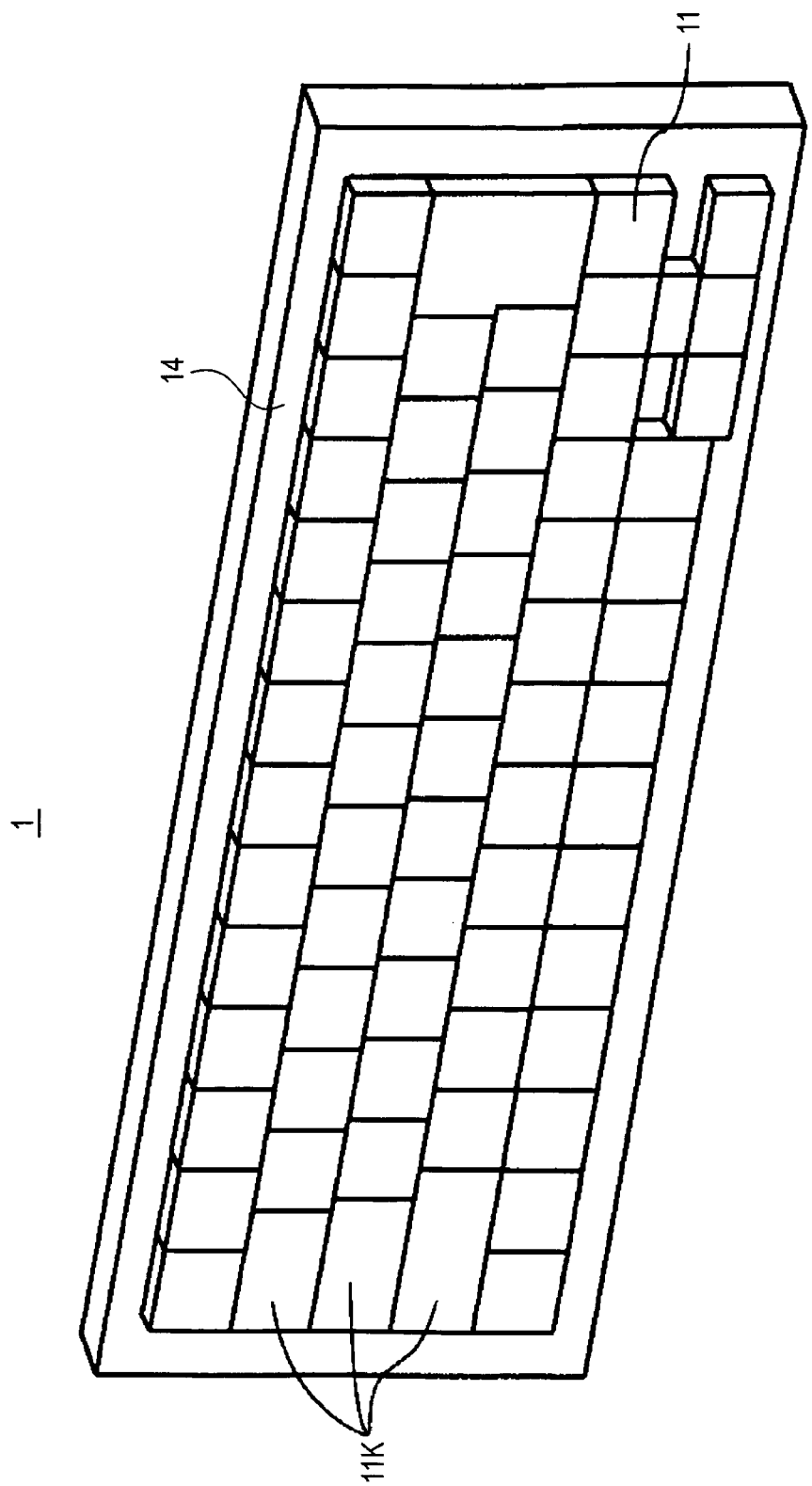
FIG. 2 is a perspective view showing the example of the configuration of the operation input apparatus to be used in the embodiment of the information processing system according to the invention.

In the X-Z sensor panel 12, a plurality of vertical wire electrodes $12V_1$, $12V_2$, $12V_3$, ..., $12V_n$ (n being an integer of 2 or greater) whose extending direction is the vertical direction (longitudinal direction) are arranged in the horizontal direction (lateral direction) in FIG. 2 at equal pitches in this example.

In the Y-Z sensor panel 13, a plurality of horizontal wire electrodes $13H_1$, $13H_2$, $13H_3$, ..., $13H_m$ (m being an integer of 2 or greater) whose extending direction is the horizontal direction (lateral direction) are arranged in the vertical direction (longitudinal direction) in FIG. 1 at equal pitches in this example.

Figure 4A:
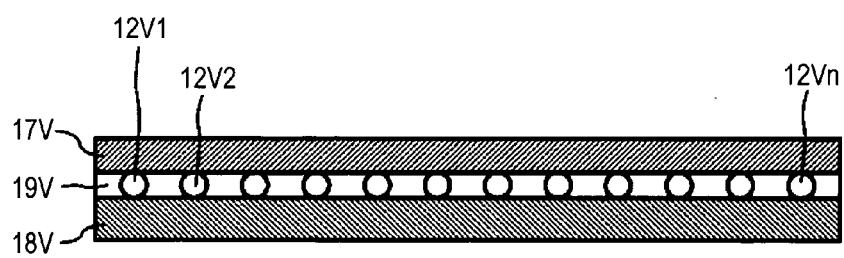
FIGS. 4A and 4B are diagrams for explaining an example of the configuration of a sensor section to be used in the operation input apparatus in the embodiment of the information processing system according to the invention.
Figure 4B:
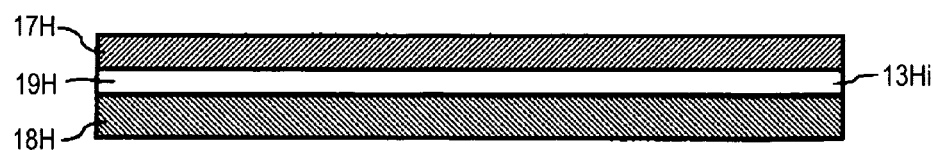

FIGS. 4A and 4B respectively show lateral cross-sectional views of the X-Z sensor panel 12 and the Y-Z sensor panel 13.

The X-Z sensor panel 12 is configured so that an electrode layer 19V including the plurality of vertical electrodes $12V_1$, $12V_2$, $12V_3$, ..., $12V_n$ is sandwiched between two glass plates 17V and 18V.

The Y-Z sensor panel 13 is configured so that an electrode layer 19H including the plurality of horizontal electrodes $13H_1$, $13H_2$, $13H_3$, ..., $13H_m$ is sandwiched between two glass plates 17H and 18H. Note that "$13H_i$" in FIG. 4B means the ith horizontal electrode.

Although not shown in FIG. 1, the X-Z sensor panel 12 and the Y-Z sensor panel 13 are provided with through holes in which operators to elastically deform the depression detection switches on the keyboard printed wiring board 15 when the respective operation keys 11K of the keyboard 11 are pressed are inserted.

The outer peripheral frame 14 is formed of, for example, a resin which is an insulating material, and is provided with a through hole 14A where the keyboard 11, the X-Z sensor panel 12 and the Y-Z sensor panel 13 are accommodated.

The keyboard printed wiring board 15 is provided at the bottom portion of the outer peripheral frame 14. As will be described later, the electrode terminals of the X-Z sensor panel 12 and Y-Z sensor panel 13 are connected to the keyboard printed wiring board 15 on which circuit configuration parts of the sensor section 10 including the X-Z sensor panel 12 and Y-Z sensor panel 13 are mounted. That is, according to the embodiment, the keyboard printed wiring board 15 is used as a printed wiring board for the sensor section 10.

The rear-side frame 16 is formed of, for example, a resin which is an insulating material, and is adhered to the outer peripheral frame 14. As apparent from the above, the operation input apparatus 1 is configured so that the constituting part of the keyboard 11 and the constituting part of the sensor section 10 are laminated in recessed parts formed in the outer peripheral frame 14 and rear-side frame 16. Therefore, as shown in FIG. 2, the operation input apparatus 1 according to the embodiment appears to be similar to a general keyboard which has been used in the past.

[Circuit Configuration of the Sensor Section 10]

According to the embodiment, as in Patent Document 1, the capacitances according to the distances between the X-Z sensor panel 12 and Y-Z sensor panel 13 of the sensor section 10 and a detection target are each converted to the oscillation frequency of an oscillation circuit, which is to be detected. In the embodiment, the sensor section 10 counts the number of pulses of a pulse signal according to the oscillation frequency, and sets the count value according to the oscillation frequency as a sensor output signal.

Figure 5:
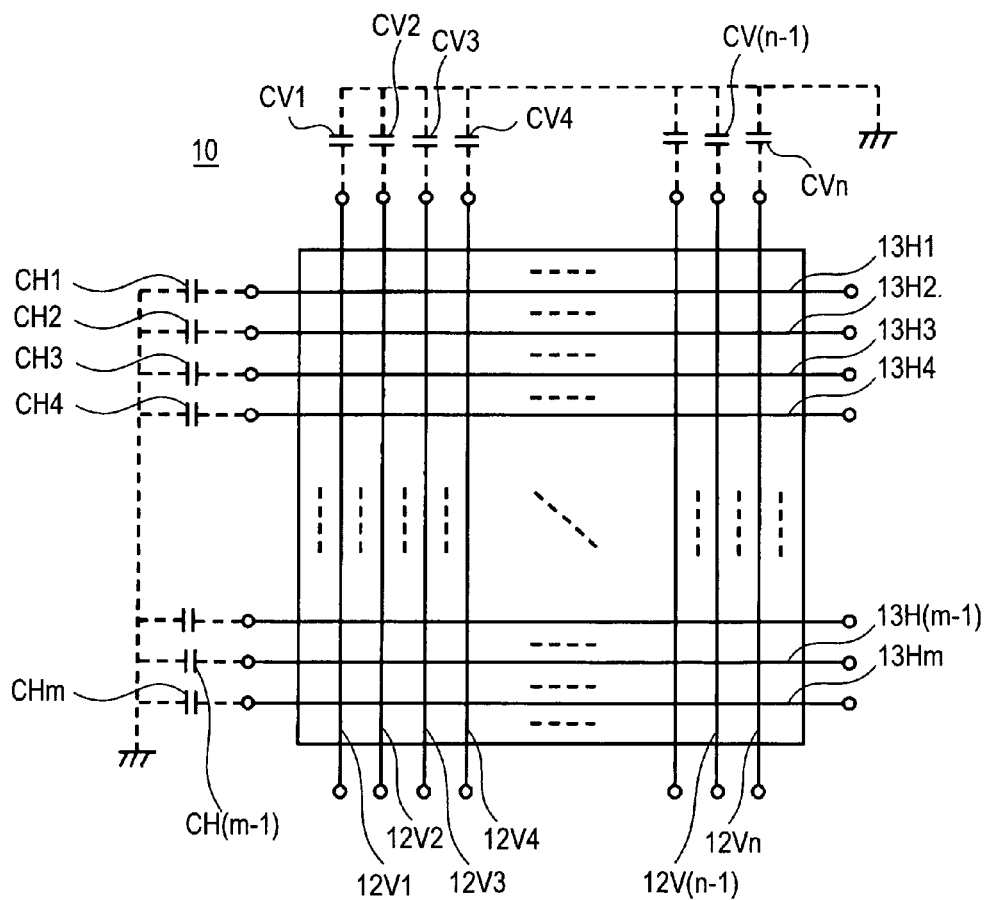
FIG. 5 is a diagram for explaining the example of the configuration of the sensor section to be used in the operation input apparatus in the embodiment of the information processing system according to the invention.
Figure 6:
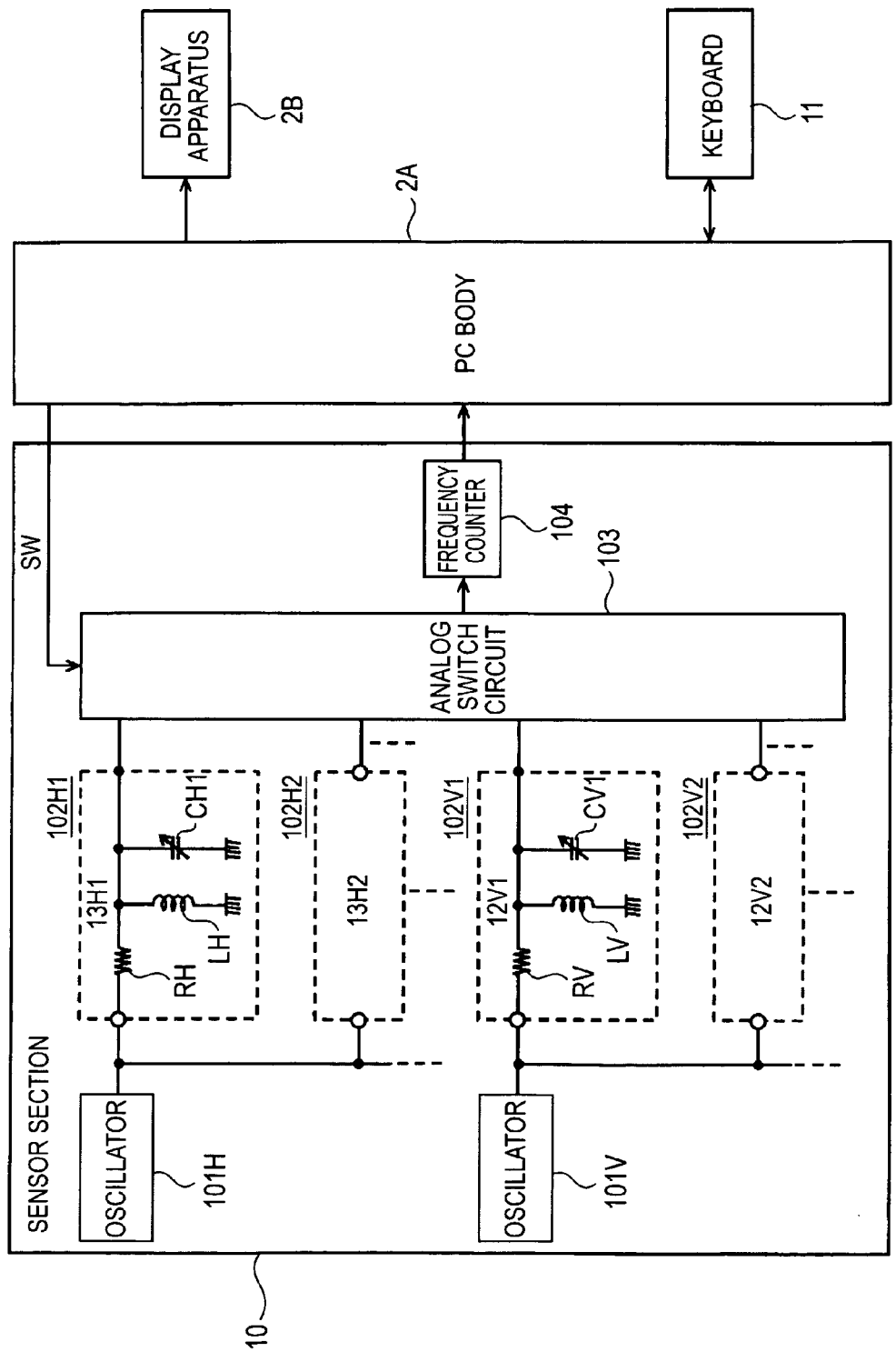
FIG. 6 is a block diagram for explaining an example of the hardware configuration of the embodiment of the information processing system according to the invention.

FIG. 5 is an explanatory diagram of the sensor panel which has the lamination of the X-Z sensor panel 12 and Y-Z sensor panel 13. FIG. 6 shows an example of a circuit configuration that generates a sensor detection output signal to be output from the sensor section 10.

As shown in FIG. 5, as mentioned above, the sensor section 10 according to the embodiment has a plurality of wire electrodes arranged in the two orthogonal directions. Specifically, the vertical electrodes 12V1, 12V2, 12V3, . . . , 12Vn and the horizontal electrodes 13H1, 13H2, 13H3, . . . , 13Hm are arranged in the orthogonal directions, respectively.

In this case, capacitances (floating capacitances) CH1, CH2, CH3, . . . , CHm are present between the horizontal electrodes 13H1, 13H2, 13H3, . . . , 13Hm and the ground, respectively. The capacitances CH1, CH2, CH3, . . . , CHm change according to the position of a hand or a finger lying in the space above the surface of the Y-Z sensor panel 13.

One end and the other end of each of the horizontal electrodes 13H1, 13H2, 13H3, . . . , 13Hm serves as a horizontal electrode terminal. In this example, one of the horizontal electrode terminals of each of the horizontal electrodes 13H1, 13H2, 13H3, . . . , 13Hm is connected to an oscillator 101H for the horizontal electrodes.

The other one of the horizontal electrode terminals of each horizontal electrode 13H1, 13H2, 13H3, . . . , 13Hm is connected to an analog switch circuit 103. As has already been described, the circuit parts shown in FIG. 6 are provided on keyboard printed wiring board 15.

In this case, each of the horizontal electrodes 13H1, 13H2, 13H3, . . . , 13Hm can be represented by an equivalent circuit as shown in FIG. 6. While FIG. 6 shows the equivalent circuit of the horizontal electrode 13H1, the same is true of the other horizontal electrodes 13H2, . . . , 13Hm.

The equivalent circuit of the horizontal electrode 13H1 includes a resistance RH, an inductance LH, and a capacitance CH1 to be detected. For the other horizontal electrodes 13H2, 13H3, . . . , 13Hm, the capacitance changes from CH1 to CH2, CH3, . . . , CHm.

The equivalent circuit of each of the horizontal electrodes 13H1, 13H2, 13H3, . . . , 13Hm constitutes a resonance circuit, and, together with the oscillator 101H, constitutes an oscillation circuit. The equivalent circuit of each horizontal electrode 13H1, 13H2, 13H3, . . . , 13Hm constitutes as a horizontal electrode capacitance detecting circuit 102H1, 102H2, 102H3, . . . , 102Hm. The output of each horizontal electrode capacitance detecting circuit 102H1, 102H2, 102H3, . . . , 102Hm becomes a signal of an oscillation frequency according to the capacitance CH1, CH2, CH3, . . . , CHm corresponding to the distance of the detection target from the surface of the Y-Z sensor panel 13.

As a user moves the position of a hand or a finger closer to or away from the surface of the Y-Z sensor panel 13 thereon, the value of the capacitor CH1, CH2, CH3, . . . , CHm changes. Each of the horizontal electrode capacitance detecting circuits 102H1, 102H2, 102H3, . . . , 102Hm, therefore, detects a change in the position of the hand or finger as a change in the oscillation frequency of the oscillation circuit.

One end and the other end of each of the vertical electrodes 12V1, 12V2, 12V3, . . . , 12Vn serves as a vertical electrode terminal. In this example, one of the vertical electrode terminals of each of the vertical electrodes 12V1, 12V2, 12V3, . . . , 12Vn is connected to an oscillator 101V for the vertical electrodes. In the example, the basic frequency of the output signal of the oscillator 101V for the vertical electrodes is set different from that of the oscillator 101H for the horizontal electrodes.

The other one of the vertical electrode terminals of each vertical electrode 12V1, 12V2, 12V3, . . . , 12Vn is connected to the analog switch circuit 103.

In this case, each of the vertical electrodes 12V1, 12V2, 12V3, . . . , 12Vn can be represented by an equivalent circuit similar to that of the horizontal electrode, as shown in FIG. 6. While FIG. 6 shows the equivalent circuit of the vertical electrode 12V1, the same is true of the other vertical electrodes 12V2, 12V3, . . . , 12Vn.

The equivalent circuit of the vertical electrode 12V1 includes a resistance RV, an inductance LV, and a capacitance CV1 to be detected. For the other vertical electrodes 12V2, 12V3, . . . , 12Vn, the capacitance changes from CV1 to CV2, CV3, . . . , CVn.

The equivalent circuit of each of the vertical electrodes 12V1, 12V2, 12V3, . . . , 12Vn constitutes a resonance circuit, and, together with the oscillator 101V, constitutes an oscillation circuit. The equivalent circuit of each vertical electrode 12V1, 12V2, 12V3, . . . , 12Vn constitutes a vertical electrode capacitance detecting circuit 102V1, 102V2, 102V3, . . . , 102Vn. The output of each vertical electrode capacitance detecting circuit 102V1, 102V2, 102V3, . . . , 102Vn becomes a signal of an oscillation frequency according to the capacitance CV1, CV2, CV3, . . . , CVn corresponding to the distance of the detection target from the surface of the X-Z sensor panel 12.

Each of the vertical electrode capacitance detecting circuits 102V1, 102V2, 102V3, . . . , 102Vn also detects a change in the value of the capacitance CV1, CV2, CV3, . . . , CVn corresponding to a change in the position of the hand or finger as a change in the oscillation frequency of the oscillation circuit.

The output of each horizontal electrode capacitance detecting circuit 102H1, 102H2, 102H3, . . . , 102Hm and the output of each vertical electrode capacitance detecting circuit 102V1, 102V2, 102V3, . . . , 102Vn are supplied to the analog switch circuit 103.

The analog switch circuit 103 sequentially selects and outputs one of the outputs of the horizontal electrode capacitance detecting circuits 102H1 to 102Hm and the vertical electrode capacitance detecting circuits 102V1 to 102Vn at a predetermined speed in response to a switch signal SW from the PC body 2A.

Then, the output of the analog switch circuit 103 is supplied to a frequency counter 104. The frequency counter 104 counts the oscillation frequency of the signal that is input thereto. That is, the input signal of the frequency counter 104 is a pulse signal according to the oscillation frequency, and the count of the number of pulses in a predetermined time duration of the pulse signal corresponds to the oscillation frequency.

The output count value of the frequency counter 104 is supplied to the PC body 2A as a sensor output for the wire electrode that is selected by the analog switch circuit 103. The output count value of the frequency counter 104 is acquired in synchronism with the switch signal SW that is supplied to the analog switch circuit 103 from the PC body 2A.

Based on the switch signal SW supplied to the analog switch circuit 103, therefore, the PC body 2A determines for which wire electrode the output count value of the frequency counter 104 represents the sensor output. Then, the PC body 2A stores the output count value in the buffer section provided therein in association with the wire electrode.

The PC body 2A detects the spatial position of a detection target (distance from the sensor section 10 and x and y coordinates at the sensor section 10) from the sensor outputs for all the wire electrodes to be detected which are stored in the buffer section.

As described in Patent Document 1, the sensor outputs from the horizontal electrode capacitance detecting circuits 102H1 to 102Hm and the vertical electrode capacitance detecting circuits 102V1 to 102Vn are actually acquired according to the x and y coordinates of the detection target over the sensor panel of the sensor section 10. As the distance to the surface of the sensor panel 10 from the x and y coordinates of the detection target located over the sensor section 10 is becomes the shortest, the sensor outputs from the horizontal electrode capacitance detecting circuit and the vertical electrode capacitance detecting circuit each of which detects a capacitance between two electrodes corresponding to that position become significant as compared with the other sensor outputs.

In view of the above, the PC body 2A acquires the x and y coordinates of the detection target located over the sensor section 10 and the distance to the detection target from the sensor section 10 both from a plurality of sensor outputs from the sensor section 10. That is, the spatial position detecting section 21 determines that the detection target, e.g., a hand, is positioned in the space over the detected x and y coordinates. Because the detection target has a predetermined size, it is detected as being separated by a distance corresponding to the capacitance in the range of the x and y coordinates over the sensor panels 12, 13 which is equivalent to the size of the detection target.

According to the embodiment, as in the case of Patent Document 1, thinning switching of the wire electrodes to detect a capacitance is carried out according to the distance of the spatially separated position of the detection target to the surface of the sensor panel 12, 13. The thinning switching of the wire electrodes is carried out as the analog switch circuit 103 controls the number of electrodes (including the case of no electrode) disposed between every two electrodes sequential selected, in response to the switch signal SW from the PC body 2A. The switching timing is determined beforehand according to the distance to the detection target from the surface of the sensor panel 12, 13, and may be a point of a layer change to be described later, for example.

Although an oscillator for the horizontal electrodes and an oscillator for the vertical electrodes are used in the foregoing description, a single common oscillator may be used instead as a simple case. Ideally, oscillators of different frequencies may be provided for the respective wire electrodes.

The PC body 2A receives a key operation output from the keyboard 11 as well as a sensor output from the sensor section 10. Then, based on the sensor output and the key operation output, the PC body 2A decides a corresponding processing control process, and changes the display image displayed on the display screen of the display unit 2B as needed.

Although the sensor section 10 and the keyboard 11 are shown as separate components in FIG. 6, they are located in the operation input apparatus 1 in this embodiment. The cable part to connect the sensor section 10 and the PC body 2A, and the cable part to connect the keyboard 11 and the PC body 2A are included in the connection cable 3.

[Example of the Processing Operation Using the Key Operation Output and Sensor Output from the Operation Input Apparatus 1]

In an example to be described below, a file selected from a plurality of files saved is displayed on the center of the display screen of the PC body 2A, and a document is adequately corrected by inputting text characters or the like through a key operation on the keyboard 11. In the example, as its assisting operation, a spatial operational input with a user's hand at the sensor section 10 is used.

Figure 7:
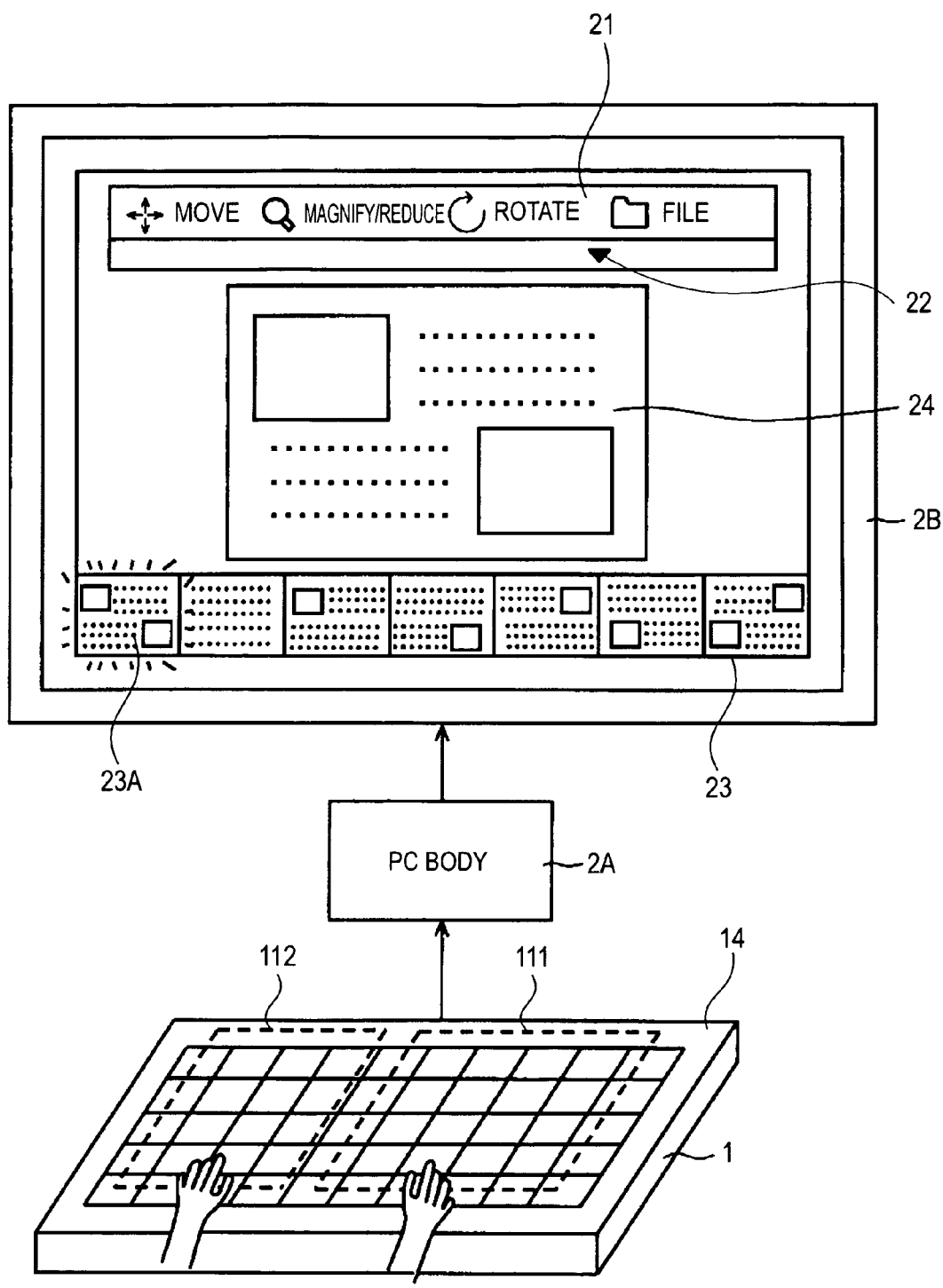
FIG. 7 is a diagram for explaining an example of a processing operation of the embodiment of the information processing system according to the invention.

FIG. 7 shows an example of the display screen of the display unit 2B in the processing example and an example of the configuration of the information processing system according to the embodiment in this case. Because the X-Z sensor panel 12 and Y-Z sensor panel 13 of the sensor section 10 are laminated to have a structure similar to that of a single sensor panel, the laminated sensor panel is shown as a sensor panel 10P in the following description.

In the processing example, as shown in FIG. 7, the two-dimensional planar area of the sensor panel 10P of the sensor section 10 is bisegmented in the right and left directions into a selection area 111 as the right segmented area and a decision area 112 as the left segmented area. Information on the segmented areas is stored in the PC body 2A which is configured to be able to discriminate from which segmented area the sensor output of the sensor section 10 comes out.

According to the embodiment, input operations are performed for the selection area 111 and the decision area 112 in the sensor section 10 at a time. According to the embodiment, as will be described later, a predetermined selection input operation is performed for the selection area 111, and a decision operation for the selection input made with respect to the selection area 111 is performed for the decision area 112.

When one person makes an operational input, for example, the selection input operation in the selection area 111 is carried out with the right hand, and the decision operation in the decision area 112 is carried out with the left hand.

Although the area of the sensor panel 10P is segmented into the selection area 111 and the decision area 112 according to the embodiment, the selection area 111 and the decision area 112 may be structured as separate sensor sections.

Figure 8:
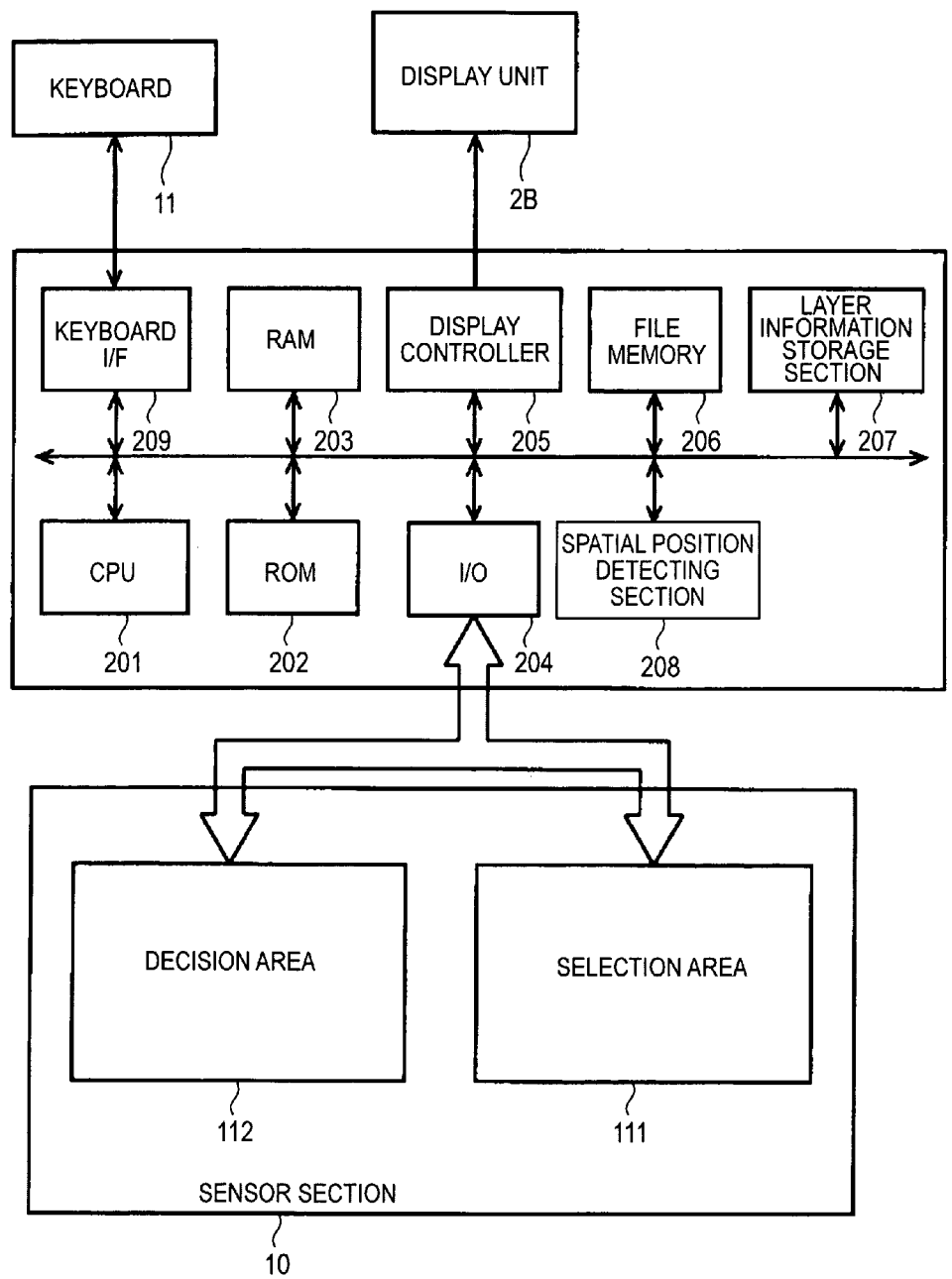
FIG. 8 is a block diagram for explaining an example of the hardware configuration of the embodiment of the information processing system according to the invention.

As shown in FIG. 8, the PC body 2A has a program ROM (Read Only Memory) 202 and a work area RAM (Random Access Memory) 203 connected to a CPU 201 (Central Processing Unit) by a system bus 200.

According to the embodiment, an I/O port 204, a display controller 205, a file memory 206 and a layer information storage section 207 are connected to the system bus 200. Further, the system bus 200 is connected with a spatial position detecting section 208 and a keyboard interface (hereinafter I/F) 209. The spatial position detecting section 208 is a functional part that can be realized as a software-based process which is executed by the CPU 201 according to a program stored in the ROM 202.

The I/O port 204 is connected to the sensor section 10 to receive output signals from the selection area 111 and the decision area 112.

The display controller 205 is connected to the display unit 2B to supply display information from the PC body 2A to the display unit 2B. The display unit 2B is configured to use, for example, an LCD as a display device.

The file memory 206 stores a plurality of files including text information and figure information in this example. The PC body 2A in this example has a function of generating the thumbnail images of files stored in the file memory 206 in an application in the processing example.

The layer information storage section 207 stores information on layers which are set in the space, detected by the sensor section 10, according to the distances from the sensor panel 10P. In this example, layer information for each of the selection area 111 and the decision area 112 is stored in the layer information storage section 207. The layer information stored in the layer information storage section 207 will be described in detail later.

Upon reception of the sensor output signals from the selection area 111 and the decision area 112 of the sensor section 10, the PC body 2A detects the spatial position of an operator's hand. Then, the PC body 2A determines to which one of a plurality of preset layers the operator's hand is positioned, or the behavior of the hand.

Then, the PC body 2A executes a processing operation according to the layer and the hand behavior which are determined from the sensor output signals of the sensor section 10. For example, the PC body 2A reads a file designated by the operator from the file memory 206, and displays the file on the display unit 2B, and performs scrolling, rotation, and magnification/reduction of the contents of the displayed file.

The PC body 2A receives the key operation output from the keyboard 11 through the keyboard interface 209, separately from the sensor output from the sensor section 10 and executes a processing operation according to the operated key.

[Multiple Layers in the Distance Direction (Z Direction) and Assignment of Functions and Function Attributes]

According to the embodiment, when the user's hand over the keyboard 11 of the operation input apparatus 1 is at such a spatial position as to operate the operation keys 11K of the keyboard 11, the PC body 2A invalidates the sensor output from the sensor section 10.

That is, according to the embodiment, the PC body 2A discriminates whether the spatially separated distance from the surface of the sensor panel 10P of the sensor section 10, which is detected from the sensor output of the sensor section 10, is equal to or greater than a predetermined distance Th. Then, the PC body 2A acquires the sensor output of the sensor section 10 as being valid only when the sensor output is equal to or greater than the predetermined distance Th. In other words, the PC body 2A has a neutral zone for the sensor output of the sensor section 10.

The predetermined distance Th is set greater by a safety-considered margin than the distance including the space where the user operates the operation keys 11K of the keyboard 11 or prepares for the operation.

First, a distance T1 including the space where the user's hand is present when the user operates the operation keys 11K of the keyboard 11 or prepares for the operation is acquired as a distance from the layout surface of the operation keys 11K of the keyboard 11 (surface including the top surface of the key tops). Next, a distance T2 between the surface of the sensor panel 10P and the layout surface of the operation keys 11K of the keyboard 11 is acquired. Finally, a margin T3 is set.

The distance Th is set as $$Th = T1 + T2 + T3.$$

Figure 9:
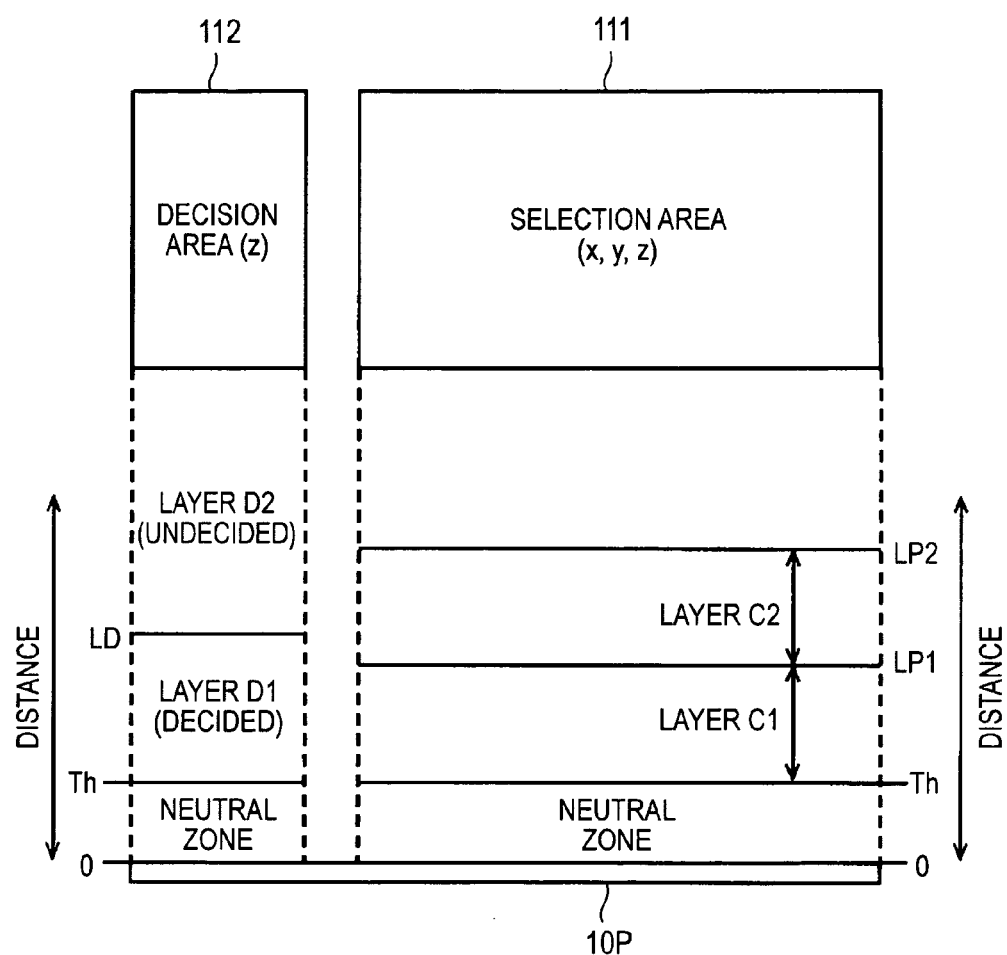
FIG. 9 is a diagram for explaining an example of setting a layer according to a distance to a detection target from a sensor in the operation input apparatus in the embodiment of the information processing system according to the invention.

FIG. 9 is a diagram for explaining a layer to be set in the space on the selection area 111 and the decision area 112 over the sensor section 10 according to the embodiment. FIG. 10 is a diagram illustrating an example of the stored contents of the layer information storage section 206 of the PC body 2A according to the embodiment.

According to the embodiment, as mentioned above, the space above the sensor panel 10P of the sensor section 10 which extends from the surface of the sensor panel 10P by the distance Th is a neutral zone where the PC body 2A neglects and invalidates the sensor output of the sensor section 10.

In the space which is set apart from the surface of the sensor panel 10P of the sensor section 10 by more than the distance Th a plurality of layers are set in the selection area 111 and the decision area 112 according to the different distances from the surface of the sensor panel 10P.

Specifically, two layers C1 and C2 are set in the selection area 111.

In this case, as shown in FIG. 9, with the surface position of the sensor panel 10P being set as the origin position 0 of the z axis, the z-directional distances to be the boundaries of the two layers C1 and C2 are set to LP1 and LP2. Therefore, the distance ranges of the layers C1 and C2 are set as Th<layer C1≦P1 and LP1≦layer B2≦LP2.

Two layers D1 and D2 are likewise set in the space in the decision area 112 over the sensor panel according to the different distances from the sensor panel surface. In this case, as shown in FIG. 9, the z-directional distances to be the boundaries of the two layers D1 and D2 are set to LD. Therefore, the distance ranges of the layers D1 and D2 are set as Th<layer D1≦LD and LD<layer B2.

That is, in the decision area 112, the distance to the sensor panel 10P is separated into the layer D1 with a smaller distance than the boundary distance LD and larger than the distance Th, and the layer D2 with a larger distance than the boundary distance LD.

According to the embodiment, the layer D2 in the space in the decision area 112 over the sensor panel 10P means "undecided" when a detection target, i.e., a hand in the example, is present in that layer, and the layer D1 means "decided" when the detection target is present in that layer. That is, as the operator moves the hand from the layer D2 to the layer D1, the motion becomes a decision operation.

As execution of the decision operation in the decision area 112 is permitted while executing the operation of selecting a function or the like in the selection area 111, the execution of the operation of selecting a function or the like in the selection area 111 can be carried out hierarchically according to the embodiment.

According to the embodiment, first, a basic function provided in the information processing system according to the embodiment can be selected by the layer selecting operation in the space over the selection area 111. In the embodiment, selection of a basic function is the operation of the high-rank layer in the selection area 111. Then, the operation in the low-rank layer in the selection area 111 is an operation of inputting the attribute of the function selected at the high-rank layer.

As the basic functions, a drag function, a file selecting function, and a magnification/reduction function are provided in the embodiment.

The drag function designates a part of an image displayed on the display screen, and moves the designated part in parallel or rotates the designated part, thereby moving or rotating the image. According to the embodiment, movement of an image and rotation thereof can be selected as separate functions. The movement of an image includes, for example, up, down, right and left scrolling of an image.

The file selecting function selects a file which the operator wants to display from files stored in the file memory 206.

The magnification/reduction function magnifies or reduces an image displayed on the display screen of the display unit 2B.

According to the embodiment, an operation of selecting a basic function is executed in the layer C2 set in the space in the selection area 111 over the sensor panel 10P.

To select a basic function, as shown in FIG. 7, a display bar 21 of basic function icon buttons is displayed on the display screen of the display unit 2B. In this example, as shown in FIG. 7, the display bar 21 shows four basic function icon buttons "move", "magnify/reduce", "rotate", and "select file".

A cursor mark 22 indicating which one of the four basic function icon buttons in the display bar 21, namely "move", "magnify/reduce", "rotate", or "select file" is under selection is displayed in connection with the display bar 21. In the example in FIG. 7, the cursor mark 22 is a triangular mark and indicates that the icon button "select file" is under selection.

With a hand placed on the layer C2, the operator can move the cursor mark 22 to select a desired basic function by moving the hand in the x, y direction within the layer C2.

Moving the hand from the layer C2 to the layer C1 in the high-rank layer of the basic function selection means confirmation of the basic function selected in the layer C2; the icon button of the basic function under selection is highlighted in the embodiment.

When the above-described decision operation is performed in the decision area 112 with confirmation done based on the highlighted display, the selection of the basic function selected in the layer C2 is set.

With regard to the high-rank layer of the basic function selection, as apparent from the above, functions are assigned to the layers C1 and C2 in the space in the selection area 111 over the sensor panel 10P as shown in FIG. 10 according to the embodiment. Specifically, a function of selecting a basic function is assigned to the layer C2, and a function of confirming a selected function is assigned to the layer C1.

As mentioned above, the operation in the low-rank layer in the selection area 111 is an input operation for the attribute of the function selected at the high-rank layer.

When the function selected in the high-rank layer is "select file", for example, the file selecting function of selecting an image file is assigned to the layer C2 in the low-rank layer of the file selection as shown in FIG. 10.

To select a file with the file selecting function, a list 23 of the thumbnail images of the contents of files stored in the file memory 206 is displayed on the display screen of the display unit 2B as shown in FIG. 7.

Moving the hand from the layer C2 to the layer C1 in the low-rank layer of the file section means confirmation of the file selected in the layer C2; the thumbnail of the file under selection is highlighted in the embodiment. The example in FIG. 7 shows that a thumbnail image 23A in the list 23 is highlighted.

When the above-described decision operation is performed in the decision area 112 with confirmation done based on the highlighted display, the file selected in the layer C2 is read from the file memory 206, and displayed as an image 24 as shown in FIG. 7.

With regard to the low-rank layer of the file selection, as apparent from the above, functions are assigned to the layers C1 and C2 in the space in the selection area 111 over the sensor panel 10P as shown in FIG. 10 according to the embodiment. Specifically, a file selecting function is assigned to the layer C2, and a function of confirming a selected image file is assigned to the layer C1.

Likewise, with regard to the low-rank layer of movement or rotation dragging, a function of selecting a drag position is assigned to the layer C2, and a function of confirming a dragging position and a drag executing function are assigned to the layer C1.

Figure 11A:
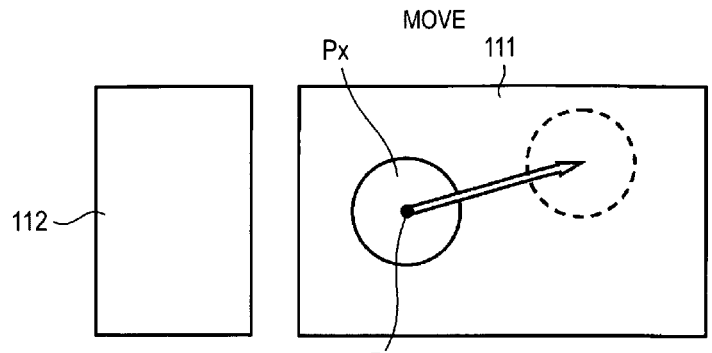
FIGS. 11A to 11C are diagrams for explaining the embodiment of the information processing system according to the invention.
Figure 11B:
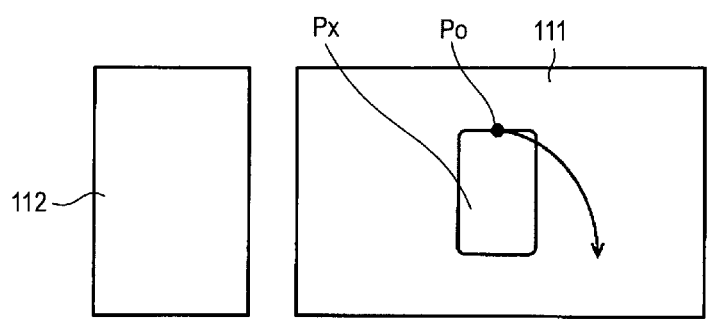
Figure 11C:
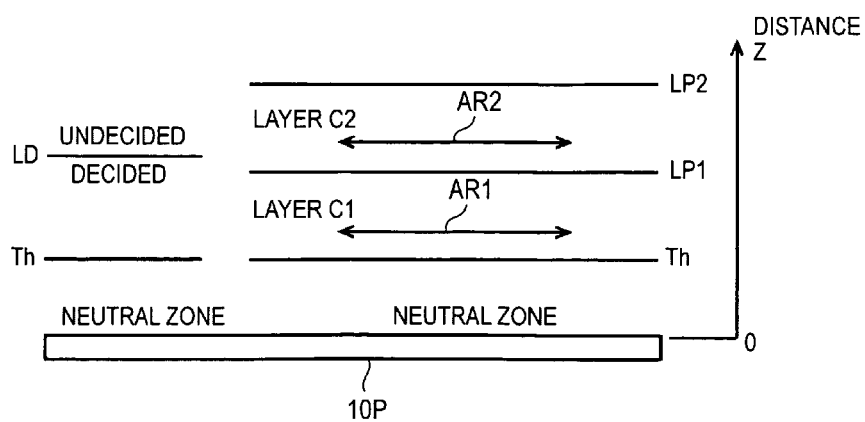

Specifically, when movement dragging is selected in the high-rank layer of the basic function selection, the operator moves the hand in the x, y direction within the layer C2 to designate the position of a part of an image, as shown by an arrow AR2 in FIG. 11C.

When the operator moves the hand to the layer C1 with a position Po of a part of an image Px being indicated in FIG. 11A or 11B, the indicated position Po is highlighted and the drag function becomes effective in the layer C1. When the operator moves the hand from the position Po horizontally as shown in FIG. 11A, therefore, the PC body 2A executes control to move the image Px in parallel according to the hand movement. That is, the operator can perform dragging by moving the hand in the x, y direction in the layer C1 as shown by an arrow AR1 in FIG. 11C.

When the above-described decision operation is performed in the decision area 112 after the moving manipulation, the display position of the image Px is set as it is, and the drag function is terminated.

When the operator rotates the hand from the position Po as shown in, for example, FIG. 11B in the layer C1, with the indicated position Po being highlighted, the PC body 2A executes control to rotate the image Px.

When the above-described decision operation is performed in the decision area 112 after the moving manipulation or rotating manipulation, the display position of the image Px is set as it is, and the drag function is terminated.

For the low-rank layer of magnification/reduction, fast magnification/reduction is assigned to the layer C2, and slow magnification/reduction is assigned to the layer C1. That is, for the low-rank layer of magnification/reduction, the speed attributes "magnification/reduction" are assigned to the layers C1 and C2.

When magnification/reduction is selected in the selection of a basic function, whether magnification or reduction is selected according to the x and y coordinates of the sensor panel 10P in the selection area 111 at the layer C1. For example, When the position of the hand at the layer C1 lies in the left-hand area or the upper area of the sensor panel 10P in the selection area 111, magnification is selected, whereas when the position of the hand at the layer C1 lies in the right-hand area or the lower area of the sensor panel 10P in the selection area 111, reduction is selected.

[Processing Operation of PC Body 2A]

In the information processing system according to the embodiment with the above-described configuration, the PC body 2A executes display control on the display image on the display unit 2B according to the positions of the left hand and right hand of the operator in the space over the sensor panel 10P of the sensor section 10, and the behaviors of the left hand and right hand.

The above description relates to spatial operational inputs made by the position and behavior of a hand in space above the neutral zone, which are to be detected by the sensor section 10. If an operation of depressing an operation key 11K on the keyboard 11 is performed, the PC body 2A always discriminates the key operation output and executes its corresponding process.

<General Processing Routine of PC Body 2A>

Figure 12:
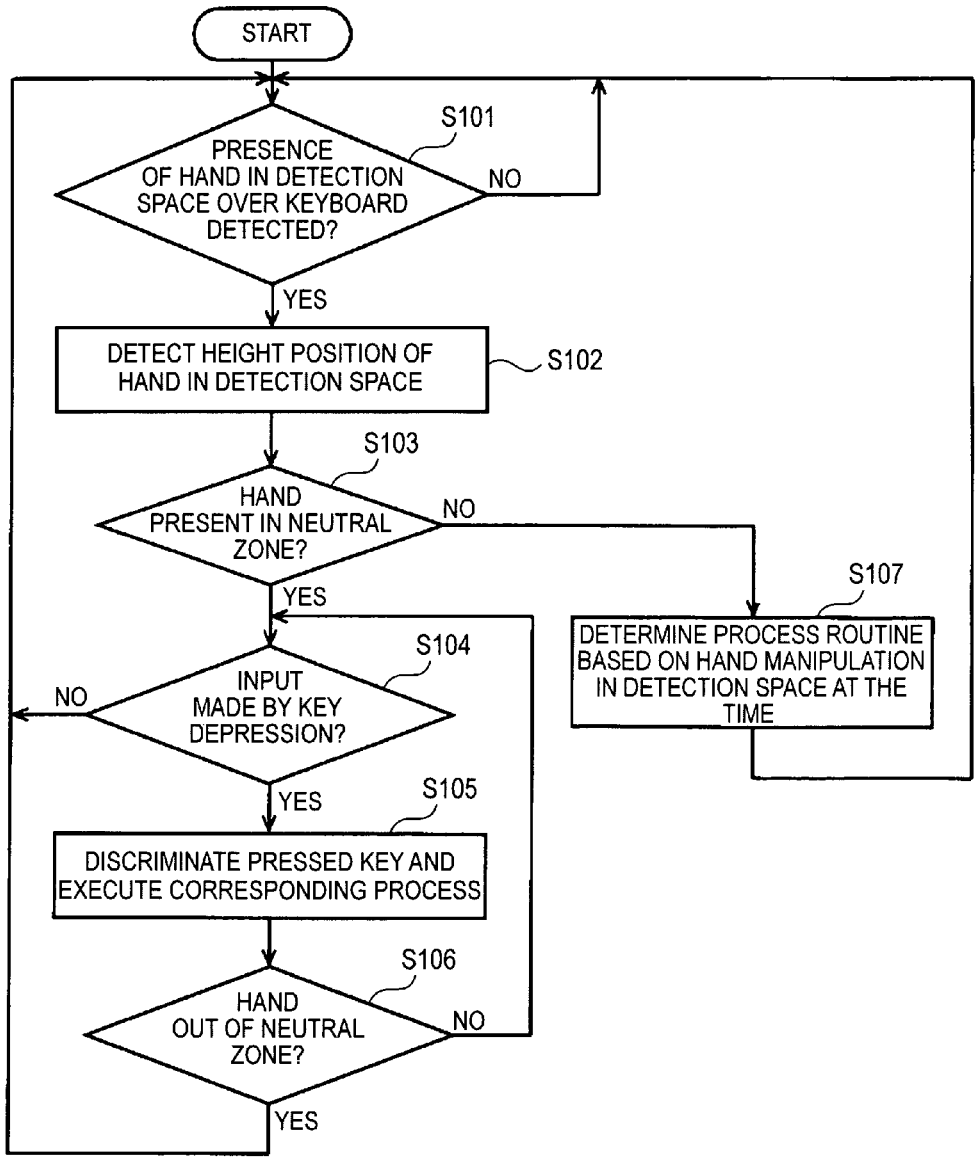
FIG. 12 is a diagram illustrating a flowchart for explaining an example of the processing operation of the embodiment of the information processing system according to the invention.

FIG. 12 is a flowchart illustrating an example of a basic the processing routine of the PC body 2A which receives a key operation output and sensor output from the operation input apparatus 1.

The CPU 201 executes the processes of the individual steps in the flowchart in FIG. 12 according to the program stored in the ROM 202 using the RAM 203 as a work area.

First, the CPU 201 discriminates whether the presence of a hand in the detection space of the hand as a detection target above the key layout surface of the keyboard 11 of the operation input apparatus 1 is detected or not (step S101). When the presence of the hand in the detection space is not detected in the step S101, the CPU 201 repeats the step S101.

When it is discriminated in step S101 that the presence of the hand in the detection space is detected, the CPU 201 detects the height position of the hand in the detection space (distance from the surface of the sensor panel 10P) by means of the spatial position detecting section 208 (step S102).

It is discriminated whether the detected height position of the hand or the detected distance from the surface of the sensor panel 10P lies in the neutral zone or not depending on whether the height position of the hand is equal to or greater than the distance Th (step S103).

When it is discriminated that the hand lies in the neutral zone, the CPU 201 neglects and invalidates the sensor output from the sensor section 10, and monitors the depression of any operation key 11K (step S104).

When it is discriminated in step S104 that no operation key 11K is depressed, the CPU 201 returns to step S101 to repeat a sequence of processes starting at step S101.

When it is discriminated in step S104 that some operation key 11K is depressed, however, the CPU 201 discriminates the depressed operation key 11K, and executes a process corresponding to the operation key (step S105). For example, a process of inputting text characters in the selected file to be described later corresponds to the process in step S105.

Next, the CPU 201 discriminates whether the hand is moved off the neutral zone or not (step S106). When it is discriminated that the hand is not moved off the neutral zone, the CPU 201 returns to step S104 to monitor the depression of any operation key 11K on the keyboard 11 and repeat a sequence of processes starting at step S104.

When it is discriminated in step S106 that the hand is moved off the neutral zone, the CPU 201 returns to step S101 to repeat a sequence of processes starting at step S101.

When it is discriminated in step S103 that the height position of the hand is above the neutral zone, the CPU 201 determines and executes a processing routine at that time for a spatial operational input made by the hand in the detection space over the sensor panel 10P (step S107).

In step S107, while the basic function selecting routine is executed first, the processing routine of the function decided by the basic function selecting routine is executed. Executing the processing routine of which function depends on which function is selected and decided previously by the basic function selecting routine.

After the step S107, the CPU 201 returns to step S101 to repeat a sequence of processes starting at step S101.

A description will now be given of an example of the basic function selecting routine which is executed in step S107 and an example of the processing routine of each function decided by the basic function selecting routine.

<Basic Function Selecting Routine>

Figure 13:
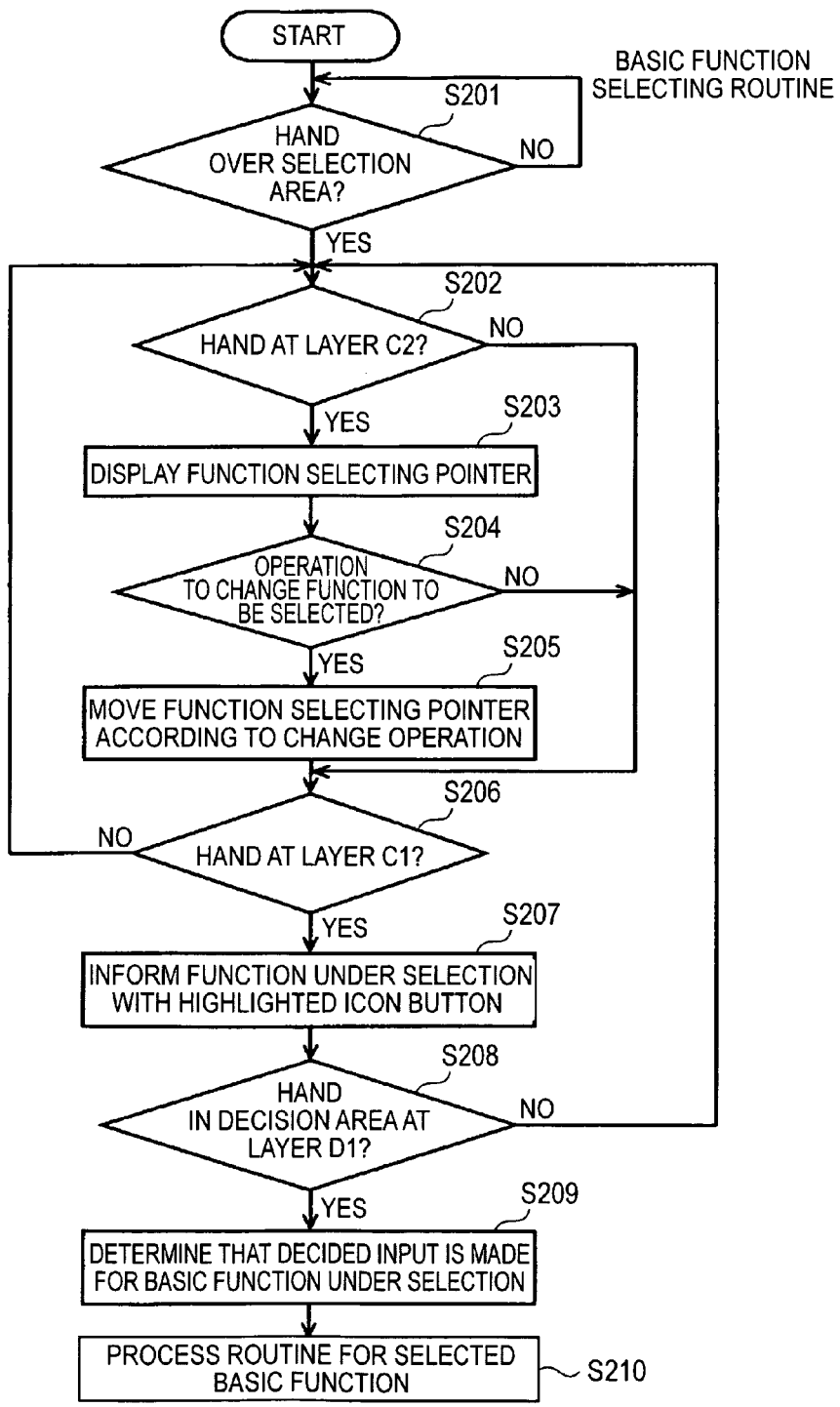
FIG. 13 is a diagram illustrating the flowchart for explaining an example of the processing operation of the embodiment of the information processing system according to the invention.

FIG. 13 is a flowchart illustrating one example of the processing operation in response to an operational input at the high-rank layer of the basic function selection in PC body 2A of the information processing system according to the embodiment. The CPU 201 of the PC body 2A executes the processes of the individual steps of the flowchart in FIG. 13 according to the program stored in the ROM 202 using the RAM 203 a work area.

At the time of initiating the basic function selecting routine, the CPU 201 has recognized the functions assigned to the layers C1 and C2, and the layers D1 and D2 in the basic function selection, meanings thereof, and the like by referring to the layer information storage section 207. In other words, the CPU 201 recognizes the basic function assigned to the layer C2 as selection of a basic function, and recognizes that what is assigned to the layer C2 is the function of confirming the selected basic function. In addition, the CPU 201 recognizes the state of a hand present in the layer D1 as a decision operation.

In this example, first, the CPU 201 of the PC body 2A monitors the output from the selection area 111 of the sensor section 10, and waits for the approach of the operator's hand in the space in the selection area 111 over the neutral zone of the sensor panel 10P (step S201).

When it is determined in step S201 that the operator's hand has approached in the space in the selection area 111 over the neutral zone of the sensor panel 10P, the CPU 201 discriminates whether the hand is positioned in the layer C2 or not (step S202).

When it is determined in step S202 that the hand is positioned in the layer C2, the CPU 201 performs a process of selecting a basic function, i.e., displays the function selection pointer or the cursor mark 22 on the display screen of the display unit 2B in this example (step S203).

Next, the CPU 201 discriminates whether or not the hand has moved in the x, y direction in the layer C2 as an operation to change a function to be selected (step S204).

When it is discriminated in step S204 that the operation to change the function to be selected is executed, the CPU 201 changes the display position of the function selection pointer or the cursor mark 22 on the display screen of the display unit 2B to a position in the layer C2 according to the change and move operation (step S205).

Next, the CPU 201 discriminates whether or not the hand has moved from the layer C2 to the layer C1 (step S206). When it is discriminated in step S204 that there is not an operation to change the function to be selected, the CPU 201 also moves to step S206 to discriminate whether or not the hand has moved from the layer C2 to the layer C1. Further, when it is discriminated in step S202 that the hand is not positioned in the layer C2, the CPU 201 also moves to step S206 to discriminate whether or not the hand lies in the layer C1.

When it is discriminated in step S206 that the hand does not lie in the layer C1, the CPU 201 returns to step S202 to repeat a sequence of processes starting at step S202.

When it is discriminated in step S206 that the hand lies in the layer C1, on the other hand, the CPU 201 executes a process of confirming the selected basic function. In this example, the CPU 201 highlights the icon button selected in the layer C2 among the basic function icon buttons in the display bar 21 for confirmation (step S207).

Next, the CPU 201 discriminates whether or not the hand in the decision area 112 over the sensor panel 10P lies in the layer D1 (step S208). When it is discriminated in step S208 that the hand in the decision area 112 over the sensor panel 10P does not lie in the layer D1, the CPU 201 returns to step S202 to repeat a sequence of processes starting at step S202.

When it is discriminated in step S208 that the hand in the decision area 112 over the sensor panel 10P lies in the layer D1, the CPU 201 determines that a decision operation has been executed for the selected basic function (step S209).

Then, the CPU 201 executes a processing routine for the selected function (step S210). When an operation to terminate the processing routine for the selected function is performed, the CPU 201 returns to step S201 to repeat a sequence of processes starting at step S201.

Next, a description will be given of an example of the processing routine for the selected function in step S210.

<Processing Routine for Dragging for Movement or Rotation>

Figure 14:
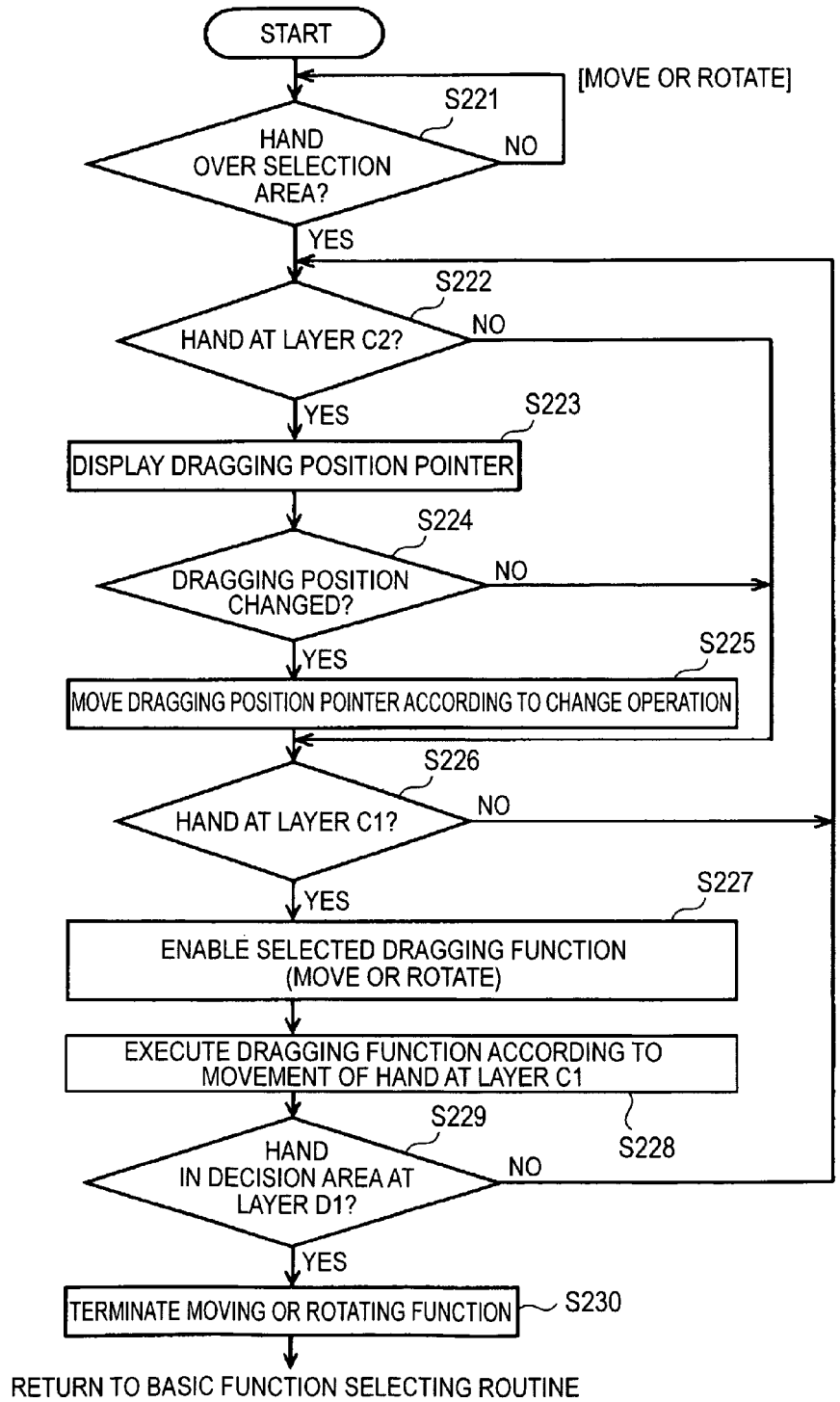
FIG. 14 is a diagram illustrating a flowchart for explaining an example of the processing operation of the embodiment of the information processing system according to the invention.

FIG. 14 shows an example of the processing routine in step S210 when the function of dragging for movement or rotation is selected in the basic function selecting routine. The CPU 201 of the PC body 2A also executes the processes of the individual steps of the flowchart in FIG. 14 according to the program stored in the ROM 202 using the RAM 203 as a work area.

At the time of initiating the processing routine for the dragging function, the CPU 201 has recognized the functions assigned to the layers C1 and C2, and the layers D1 and D2 in the dragging function, meanings thereof, and the like by referring to the layer information storage section 207. That is, the CPU 201 recognizes the function assigned to the layer C2 as selection of a dragging position, and recognizes the function assigned to the layer C2 as the dragging position confirming and drag executing function. In addition, the CPU 201 recognizes the state of a hand present in the layer D1 as a decision operation or an operation of terminating the dragging function in this case.

First, the CPU 201 of the PC body 2A monitors the output from the selection area 111 of the sensor section 10, and waits for the approach of the operator's hand in the space in the selection area 111 over the neutral zone of the sensor panel 10P (step S221).

When it is determined in step S221 that the operator's hand has approached in the space in the selection area 111 over the neutral zone of the sensor panel 10P, the CPU 201 discriminates whether the hand is positioned in the layer C2 or not (step S222).

When it is determined in step S222 that the hand is positioned in the layer C2, the CPU 201 performs a process for the dragging position selecting function assigned to the layer C2. In this example, first, the CPU 201 displays a dragging position pointer or a dragging point Po on the display screen of the display unit 2B (step S223). Next, the CPU 201 discriminates whether or not the hand has moved in the x, y direction in the layer C2 to indicate an operation to change the dragging position (step S224).

When it is discriminated in step S224 that the operation to change the dragging position is executed, the CPU 201 changes the display position of the dragging position Po on the display screen of the display unit 2B to a position in the layer C2 according to the change and move operation (step S225).

Next, the CPU 201 discriminates whether or not the hand has moved from the layer C2 to the layer C1 (step S226).

When it is discriminated in step S224 that there is not an operation to change the dragging position, the CPU 201 also moves to step S226 to discriminate whether or not the hand has moved from the layer C2 to the layer C1. Further, when it is discriminated in step S222 that the hand is not positioned in the layer C2, the CPU 201 also moves to step S226 to discriminate whether or not the hand lies in the layer C1.

When it is discriminated in step S226 that the hand does not lie in the layer C1, the CPU 201 returns to step S222 to repeat a sequence of processes starting at step S222.

When it is discriminated in step S226 that the hand lies in the layer C1, on the other hand, the CPU 201 enables the dragging function, i.e., the moving or rotating function in this example. Then, the CPU 201 highlights the designated dragging position, and highlights the icon button of either movement or rotation selected in the layer C2 among the basic function icon buttons in the display bar 21 for confirmation (step S227).

Next, the CPU 201 discriminates executes the dragging process corresponding to the movement of the hand in the x, y direction in the layer C1, namely, image movement (or scrolling) or image rotation (step S228).

Next, the CPU 201 discriminates whether or not the hand in the decision area 112 over the sensor panel 10P lies in the layer D1 (step S229). When it is discriminated in step S229 that the hand in the space in the decision area 112 over the sensor panel 10P does not lie in the layer D1, the CPU 201 returns to step S222 to repeat a sequence of processes starting at step S222.

When it is discriminated in step S229 that the hand in the decision area 112 over the sensor panel 10P lies in the layer D1, the CPU 201 terminates the dragging function for movement or rotation under execution (step S230). Then, the CPU 201 returns to step S201 in FIG. 13 to resume the basic function selecting routine.

When the hand is placed in the neutral zone and an operation key 11K on the keyboard 11 is depressed after the processing routine for the movement or rotational dragging is terminated, the PC body 2A executes a process corresponding to the depressed key. That is, a character key input or the like is performed.

<Processing Routine for File Selection>

Figure 15:
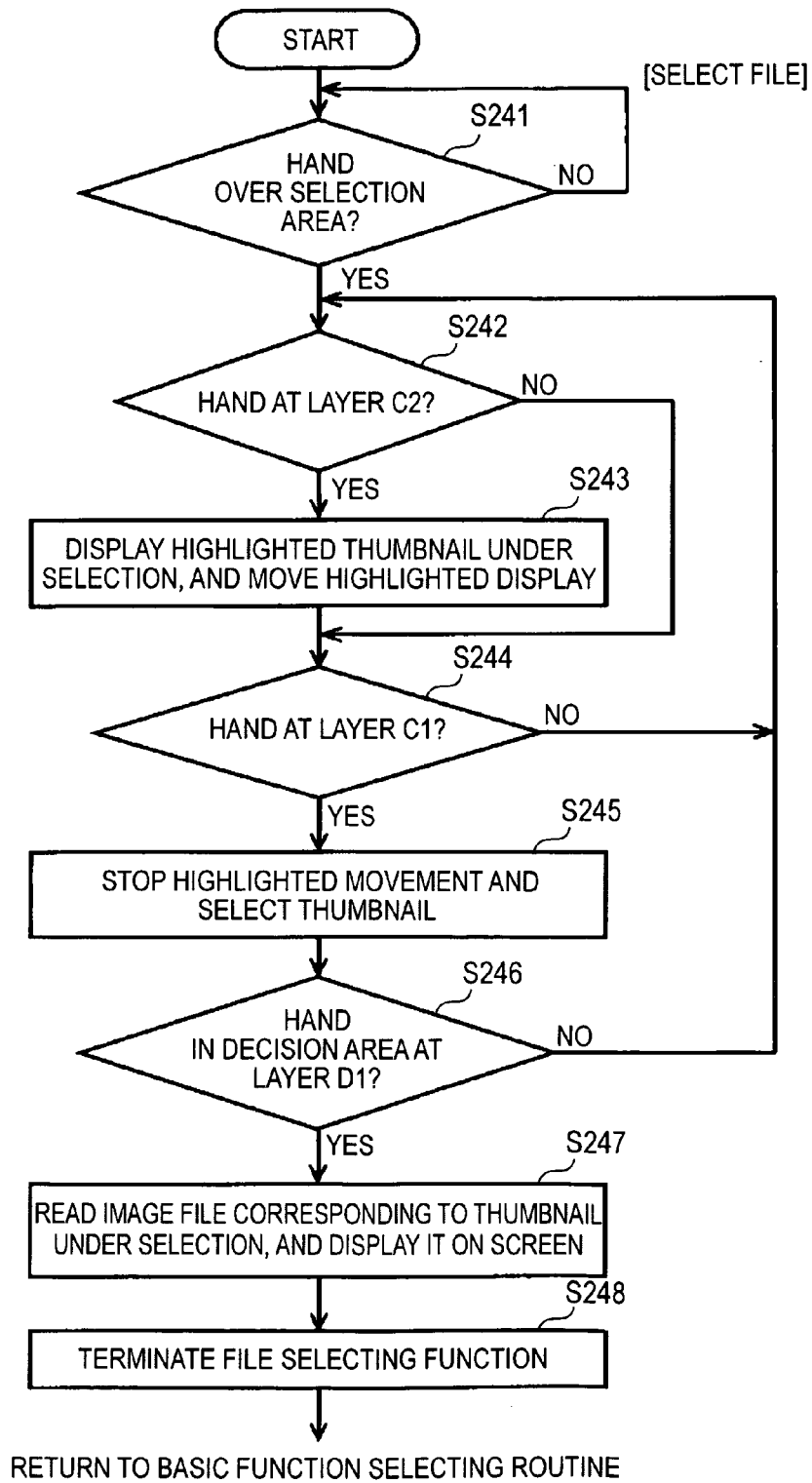
FIG. 15 is a diagram illustrating a flowchart for explaining an example of the processing operation of the embodiment of the information processing system according to the invention.

FIG. 15 shows an example of the processing routine in step S210 when the file selecting function is selected in the basic function selecting routine. The CPU 201 of the PC body 2A also executes the processes of the individual steps of the flowchart in FIG. 15 according to the program stored in the ROM 202 using the RAM 203 as a work area.

At the time of initiating the processing routine for the file selecting function, the CPU 201 has recognized the functions assigned to the layers C1 and C2, and the layers D1 and D2 in the file selecting function, meanings thereof, and the like by referring to the layer information storage section 207. That is, the CPU 201 recognizes the function assigned to the layer C2 as file selection, and recognizes the function assigned to the layer C2 as the function to confirm the selected file. In addition, the CPU 201 recognizes the state of a hand present in the layer D1 as a decision operation or a file deciding operation in this case.

First, the CPU 201 of the PC body 2A monitors the output from the selection area 111 of the sensor section 10, and waits for the approach of the operator's hand in the space in the selection area 111 over the neutral zone of the sensor panel 10P (step S241).

When it is determined in step S221 that the operator's hand has approached in the space in the selection area 111 over the neutral zone of the sensor panel 10P in a selection area 51, the CPU 201 discriminates whether the hand is positioned in the layer C2 or not (step S242).

When it is determined in step S222 that the hand is positioned in the layer C2, the CPU 201 performs a process for the file selecting function assigned to the layer C2. In this example, the CPU 201 highlights the thumbnail image under selection in the thumbnail image list 23 displayed on the display screen of the display unit 2B, and moves the thumbnail image to be highlighted (step S243).

Next, the CPU 201 discriminates whether or not the hand has moved from the layer C2 to the layer C1 (step S244). When it is discriminated in step S242 that the hand is not positioned in the layer C2, the CPU 201 also moves to step S224 to discriminate whether or not the hand lies in the layer C1.

When it is discriminated in step S244 that the hand does not lie in the layer C1, the CPU 201 returns to step S242 to repeat a sequence of processes starting at step S242.

When it is discriminated in step S244 that the hand lies in the layer C1, on the other hand, the CPU 201 stops moving the thumbnail image to be highlighted, and informs for confirmation that the thumbnail image at the stopped position is selected to be highlighted (step S245).

Next, the CPU 201 discriminates whether or not the hand in the decision area 112 over the sensor panel 10P lies in the layer D1 (step S246). When it is discriminated in step S246 that the hand in the decision area 112 over the sensor panel 10P does not lie in the layer D1, the CPU 201 returns to step S242 to repeat a sequence of processes starting at step S242.

When it is discriminated in step S246 that the hand in the decision area 112 over the sensor panel 10P lies in the layer D1, the CPU 201 determines that the informed thumbnail image under selection is selected. Then, the CPU 201 reads data on a file corresponding to the selected thumbnail image from the file memory 206, and displays the data as the image 24 on the display screen of the display unit 2B (step S247).

Next, the CPU 201 terminates the processing routine for the file selecting function (step S248), and then returns to step S201 in FIG. 13 to resume the basic function selecting routine.

When the hand is placed in the neutral zone and an operation key 11K on the keyboard 11 is depressed after the processing routine for the file selection is terminated, the PC body 2A executes a process corresponding to the depressed key. That is, a character key input or the like is made in the selected file.

<Processing Routine for Magnification/Reduction>

Figure 16:
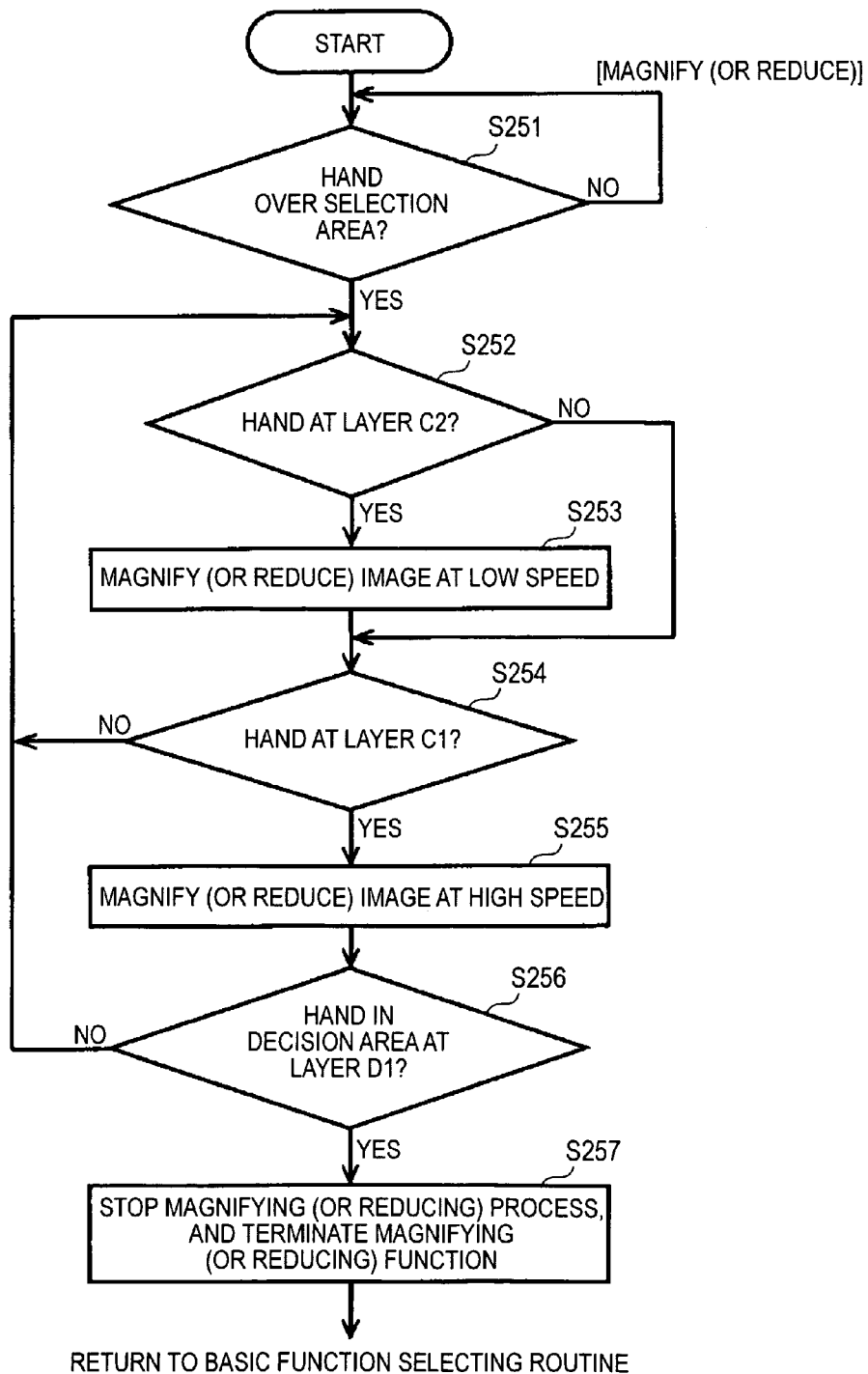
FIG. 16 is a diagram illustrating a flowchart for explaining an example of the processing operation of the embodiment of the information processing system according to the invention.

FIG. 16 shows an example of the processing routine in step S210 when the magnification/reduction function is selected in the basic function selecting routine. The CPU 201 of the PC body 2A also executes the processes of the individual steps of the flowchart in FIG. 16 according to the program stored in the ROM 202 using the RAM 203 as a work area.

As described above, in selecting the magnification/reduction function is selected in the basic function selecting routine, either magnification or reduction is selected according to the difference in the selection area in the sensor panel 10P of the selection area 111, such as the left area and right area, or the upper area and lower area.

At the time of initiating the processing routine for the magnification/reduction function, the CPU 201 has recognized the functions assigned to the layers C1 and C2, and the layers D1 and D2 in the magnification/reduction function, meanings thereof, and the like by referring to the layer information storage section 207. That is, the CPU 201 recognizes the function assigned to the layer C2 as slow magnification/reduction process, and recognizes the function assigned to the layer C2 as fast magnification/reduction process. In addition, the CPU 201 recognizes the state of a hand present in the layer D1 as a decision operation or an operation of terminating the magnification/reduction function in this case.

Then, the CPU 201 of the PC body 2A first monitors the output from the selection area 111 of the sensor section 10, and waits for the approach of the operator's hand in the space in the selection area 111 over the sensor panel 10P (step S251).

When it is determined in step S251 that the operator's hand has approached in the space in the selection area 111 over the sensor panel 10P, the CPU 201 discriminates whether the hand is positioned in the layer C2 or not (step S252).

When it is determined in step S252 that the hand is positioned in the layer C2, the CPU 201 performs a process for the function assigned to the layer C2, namely, slow image magnification or reduction (step S253).

Next, the CPU 201 discriminates whether or not the hand has moved from the layer C2 to the layer C1 (step S254). When it is discriminated in step S252 that the hand is not positioned in the layer C2, the CPU 201 also moves to step S254 to discriminate whether or not the hand lies in the layer C1.

When it is discriminated in step S254 that the hand does not lie in the layer C1, the CPU 201 returns to step S252 to repeat a sequence of processes starting at step S252.

When it is discriminated in step S254 that the hand lies in the layer C1, on the other hand, the CPU 201 performs the function assigned to the layer C2, namely, fast image magnification or reduction (step S255).

Next, the CPU 201 discriminates whether or not the hand in the decision area 112 over the sensor panel 10P lies in the layer D1 (step S256). When it is discriminated in step S256 that the hand in the decision area 112 over the sensor panel 10P does not lie in the layer D1, the CPU 201 returns to step S252 to repeat a sequence of processes starting at step S252.

When it is discriminated in step S256 that the hand in the decision area 112 over the sensor panel 10P lies in the layer D1, the CPU 201 stops image magnification or reduction, and terminates the processing routine for the magnification/reduction function (step S248). Then, the CPU 201 returns to step S201 in FIG. 13 to resume the basic function selecting routine.

When the hand is placed in the neutral zone and an operation key 11K on the keyboard 11 is depressed after the processing routine for the magnification/reduction function is terminated, the PC body 2A executes a process corresponding to the depressed key. That is, a character key input or the like is made in the magnified or reduced file.

According to the first embodiment, as described above, the operator can perform an input operation using the operation keys 11K of the keyboard 11 of the operation input apparatus 1, and can select and execute a plurality of hierarchical functions with spatial operational inputs made in non-contact with the operation panel of the keyboard 11. The embodiment has a merit that the operation is simple; for example, the operator selects a function by moving, for example, the right hand up and down in the space in the selection area 111 over the sensor panel 10P, and performs a decision operation by moving the left hand up and down in the space in the decision area 112 over the sensor panel 10P.

As a spatial input operation is made in the space over the neutral zone of the keyboard 11 with a hand while inputting a text character using the operation keys on the keyboard 11, it is possible to execute a process of scrolling or magnifying/reducing the input character image. This eliminates the need for using a plurality of input operation sections, and permits various operational inputs to be made.

Although the foregoing description of the first embodiment has been given of the case where a function or a thumbnail under selection is highlighted, which is not restrictive, any notification display which can appeal to a user can of course be employed.

In the foregoing embodiment, the sensor panel surface of the sensor section 10 is separated into the selection area 111 and the decision area 112, and an input selected in the selection area 111 is decided in the decision area 112. However, the sensor panel surface of the sensor section 10 may not be separated and allowed to entirely serve as the selection area, and a decision input operation may be performed by operating an operation key like an "Enter" key on the keyboard 11.

In this case, it is possible to carry out an operation of performing the above-described spatial input operation with, for example, the left hand in the space above the neutral zone while operating the "Enter" key with a middle finger or so of the right hand.

Second Embodiment

Although the first embodiment takes the form of an information processing system having the operation input apparatus 1 and the PC 2, the invention can be worked as an information processing apparatus having an operation input section having a structure similar to that of the operation input apparatus 1 as a partial component.

Figure 17:
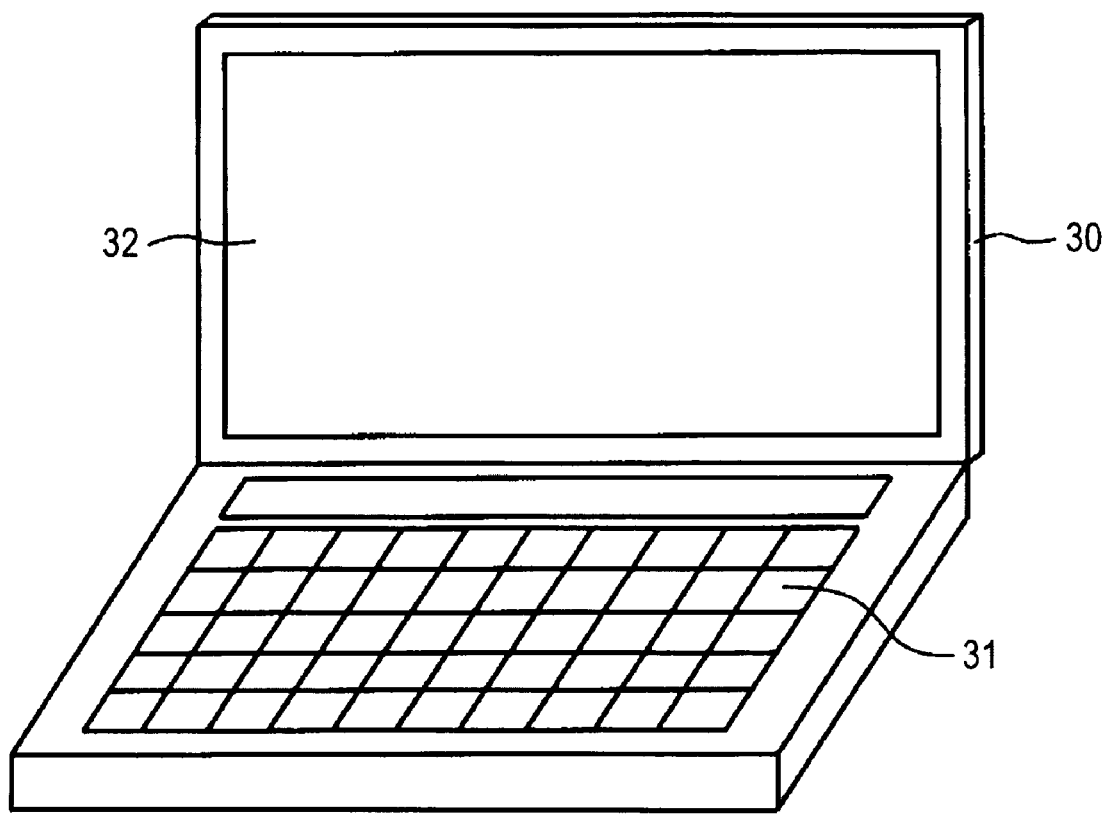
FIG. 17 is a diagram for explaining an embodiment of an information processing apparatus according to the invention.

For example, FIG. 17 shows an example of the configuration of an embodiment in which the invention is used as a notebook type PC; the overview configuration is hardly changed as apparent from FIG. 17.

However, an X-Z sensor panel, a Y-Z sensor panel, a keyboard printed wiring board, etc., like those shown in FIG. 1, are disposed under a keyboard section 31 of a notebook type PC 30 serving as an information processing apparatus according to the embodiment shown in FIG. 17.

The notebook type PC 30 according to the second embodiment can execute processing operations similar to those of the first embodiment.

In a document input application, for example, character inputs can be made with the keyboard section 31 and control can be performed according to the position of a hand in the space located above the neutral zone over the surface of the keyboard section 31. For example, it is possible to scroll a character string up or down or rightward or leftward on the character input screen displayed on a display screen 32, and magnify/reduce the size of the displayed characters.

Third Embodiment

The third embodiment also relates to an information processing apparatus. According to the third embodiment, the information processing apparatus is a cell phone terminal 40.

Figure 18:
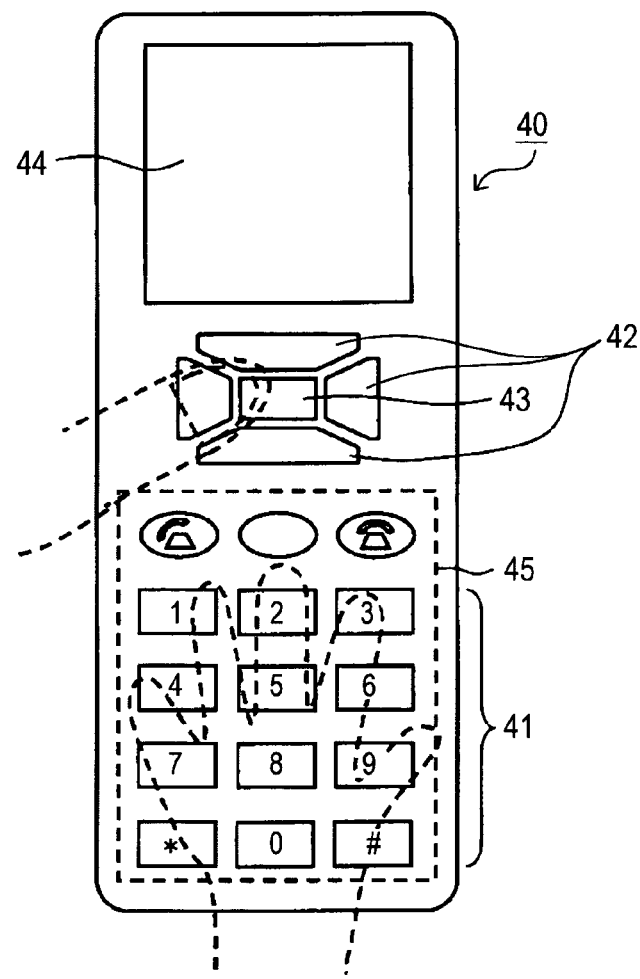
FIG. 18 is a diagram for explaining another embodiment of the information processing apparatus according to the invention.

As shown in FIG. 18, the key operation section of the cell phone terminal 40 according to the embodiment includes ten keys 41, directional (UP, DOWN, RIGHT and LEFT) keys 42, and a SET key 43. Because the key operation section has few ten keys 41, plural types of character inputs are assigned to each operation key.

In the past, a character type to be input is set by using the UP/DOWN/RIGHT/LEFT key 42 and the SET key 43, and is selected by pressing a single operation key multiple times. Such an operational input is very troublesome.

According to the third embodiment, character types to be input by the ten keys 41 are set according to the height position of the hand in the space over the ten keys 41 of the key operation section. The decision operation is the depression of the SET key 43 in this example.

According to the third embodiment, a sensor panel 45 is provided under the ten keys 41 as in the sensor section 10 according to the first embodiment. Since the sensor section has only to detect the position of a hand in the embodiment, the sensor panel 45 can be a single sensor panel, namely the X-Z sensor panel or the Y-Z sensor panel.

Though not illustrated, a printed wiring board on which switches or the like for detecting depression of the ten keys 41 and a circuit as shown in FIG. 6 for generating a sensor output of the sensor panel 45 are formed is disposed under the sensor panel 45.

Figure 19:
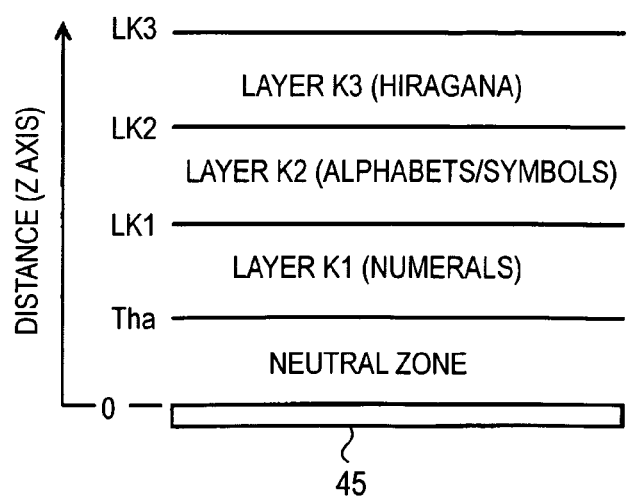
FIG. 19 is a diagram for explaining an example of setting a layer according to a distance to a detection target from a sensor section in the another embodiment of the information processing apparatus according to the invention.

While the cell phone terminal 40 according to the embodiment, like the foregoing embodiments, has a layer information storage section, layer information to be stored in the storage section is one as shown in FIG. 19.

According to the third embodiment, as mentioned above, the space above the sensor panel 45 which extends from the surface of the sensor panel 45 by a distance Tha is also set as a neutral zone where the PC body 2A neglects and invalidates the sensor output of the sensor section 10.

The distance Tha is determined in the same manner as the distance Th according to the first embodiment. First, a distance T1$a$ including the space where the user's hand is present when the user operates the ten keys 41 operation keys 11K or prepares for the operation is acquired as a distance from the operational surface of the ten keys 41 of the cell phone terminal 40. Next, a distance T2$a$ between the surface of the sensor panel 45 and the operational surface of the ten keys 41 is acquired. Finally, a margin T3$a$ is set.

The distance Tha is set as $$Tha = T1a + T2a + T3a.$$

In the space which is separated from the surface of the sensor panel 45 by more than the distance Tha, a plurality of layers are set according to the different distances from the surface of the sensor panel 45. Three layers K1, K2 and K3 are set in this example.

In this case, as shown in FIG. 19, with the surface position of the sensor panel 45 being set as the origin position 0 of the z axis, the z-directional distances to be the boundaries of the three layers K1, K2 and K3 are set to LK1, LK2 and LK3. Therefore, the distance ranges of the layers K1, K2 and K3 are set as Tha<layer K1$\leq$LK1, LK1<layer K2$\leq$LK2, LK2<layer K3$\leq$LK3.

The third embodiment is configured in such a way that character types to be input using the ten keys 41 can be changed according to in which one of the layers K1, K2 and K3 the hand is located.

Specifically, though not illustrated, a correlation table correlating the layers K1, K2 and K3 with character types assigned thereto as indicated by brackets in FIG. 19 is stored in the layer information storage section in the embodiment. In the example in FIG. 19, "numerals" is assigned to the layer K1, "alphabets/symbols" is assigned to the layer K2, and "hiragana" is assigned to the layer K3.

The third embodiment is configured in such a way that a decision operation to make a decision in which one of the layers K1, K2 and K3 is performed by the SET key 43.

For example, a layer is selected by moving the right hand up and down in the space over the ten keys 41 with the left hand holding the cell phone terminal 40 and the thumb of the left hand positioned at the SET key 43 as indicated by the broken-lined hands in FIG. 18.

In the cell phone terminal 40 according to the embodiment, the user is informed of in which one of the layers K1, K2 and K3 a hand is located by displaying a character type assigned to the hand-positioning layer on a display screen 44.

The user holds the right hand at the spatial position of the layer of the desired character type to be selected by moving the right hand up and down in the space over the ten keys 41 while viewing the character types displayed on the display screen 44. The user then depresses the SET key 43 with the thumb of the left hand. As a result, the character type to be input is decided by the user using the ten keys 41.

Figure 20A:
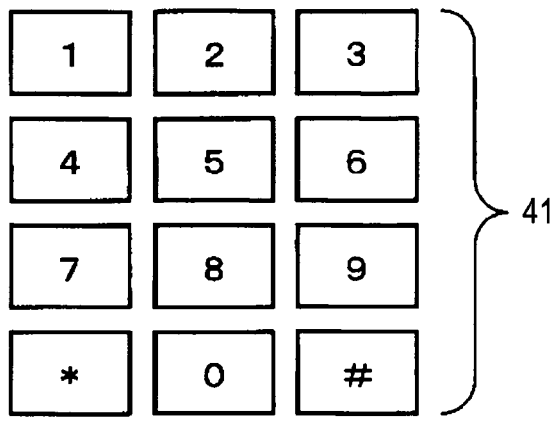
FIGS. 20A to 20C are diagrams for explaining the example of setting a layer according to the distance to the detection target from the sensor section in the another embodiment of the information processing apparatus according to the invention.

Specifically, when the layer K1 is selected, the ten keys 41 become numerals input keys as shown in FIG. 20A.

Figure 20B:
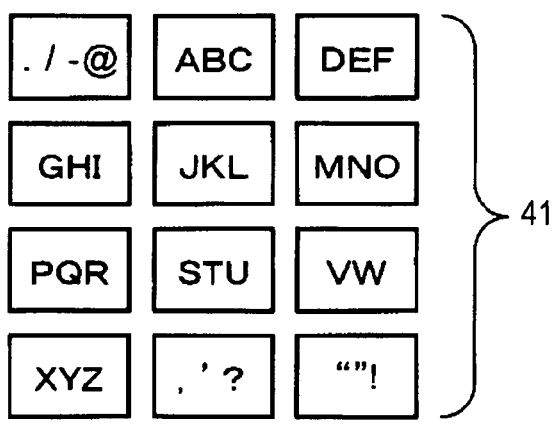

When the layer K2 is selected, the ten keys 41 become alphabets/symbols input keys as shown in FIG. 20B. In this case, as shown in FIG. 20B, a plurality of characters are assigned to each single key in the ten keys 41, and depressing the same key plural times changes the input character one by one. At this time, the input character is displayed on the display screen 44, and the then displayed character is set by depressing the LEFT or RIGHT key, or the SET key 43, or another one of the ten keys 41. This is the same as done in the past.

Figure 20C:
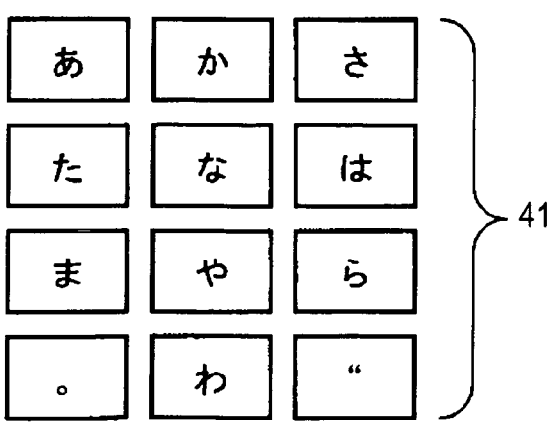

When the layer K3 is selected, the ten keys 41 become hiragana input keys as shown in FIG. 20C. In this case, a row of hiragana characters, such as the "A" row, "KA" row or "SA", is assigned to a corresponding one of the ten keys 41, and, as in the case of the alphabets/symbols input keys, a plurality of characters are assigned to each single key in the ten keys 41. As in the case of the alphabets/symbols input keys, depressing the same key plural times changes the input character one by one, and displays the input character on the display screen 44 each time. The then displayed character is set by depressing the LEFT or RIGHT key, or the SET key 43, or another one of the ten keys 41.

<Example of the Processing Operation of the Third Embodiment>

Figure 21:
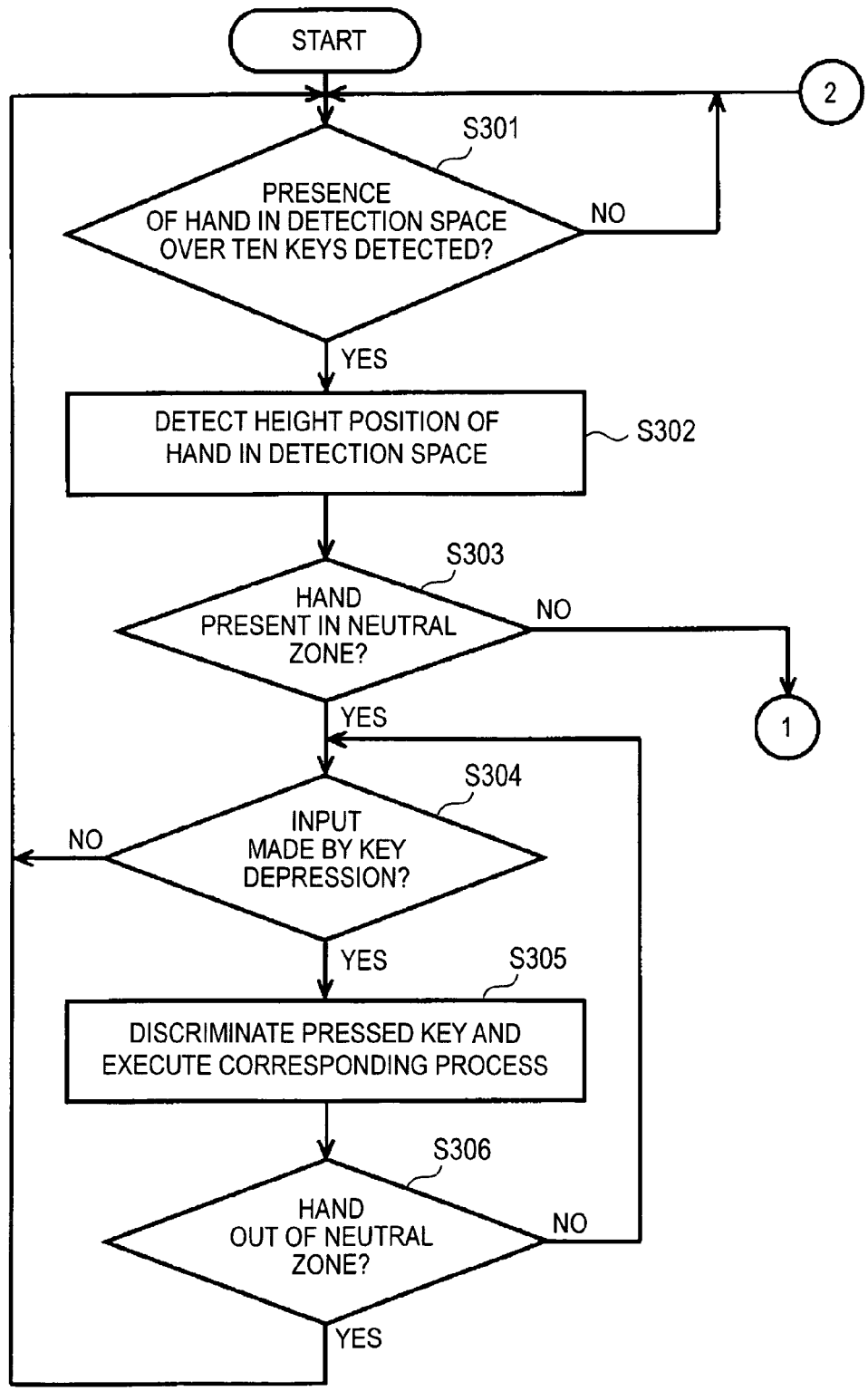
FIG. 21 is a diagram illustrating a part of a flowchart for explaining an example of the processing operation of the another embodiment of the information processing apparatus according to the invention.
Figure 22:
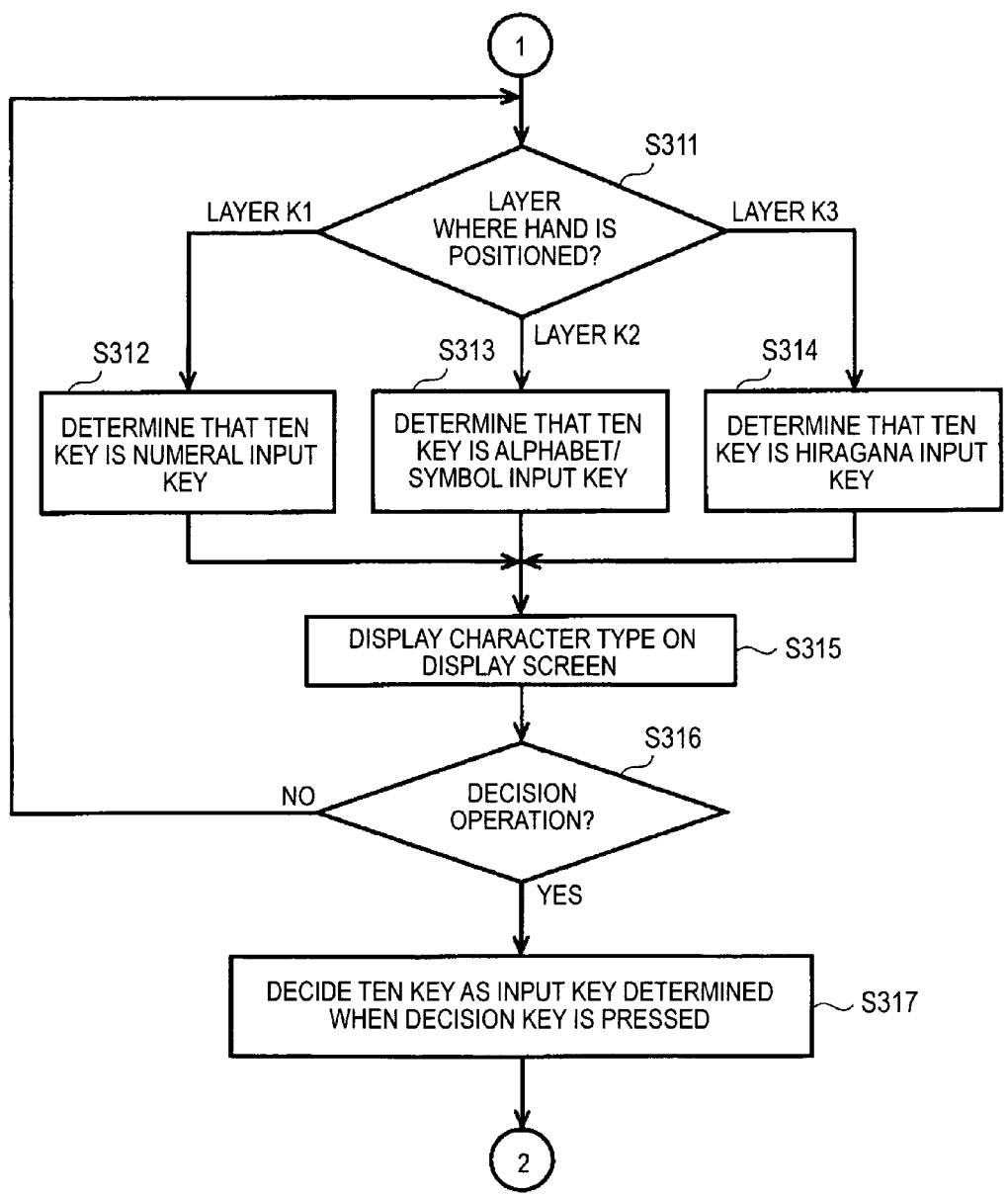
FIG. 22 is a diagram illustrating a part of the flowchart for explaining the example of the processing operation of the another embodiment of the information processing apparatus according to the invention.

FIGS. 21 and 22 are flowcharts illustrating an example of the processing operation of the cell phone terminal 40 as an information processing apparatus according to the third embodiment in response to an operation input made by the user. A microcomputer provided in the cell phone terminal 40 executes the processes of the individual steps in FIGS. 21 and 22 according to the program stored in the memory.

First, the microcomputer of the cell phone terminal 40 discriminates whether the presence of a hand in the detection space of the hand as a detection target above the key layout surface of the ten keys 41 (step S301). When the presence of the hand in the detection space is not detected in the step S301, the microcomputer repeats the step S301.

When it is discriminated in step S301 that the presence of the hand in the detection space is detected, the microcomputer detects the height position of the hand in the detection space (distance from the surface of the sensor panel 45) (step S302).

Then, the microcomputer discriminates whether the detected height position of the hand or the detected distance from the surface of the sensor panel 45 lies in the neutral zone or not depending on whether the height position of the hand is equal to or greater than the distance Tha (step S303).

When it is discriminated that the hand lies in the neutral zone, the microcomputer neglects and invalidates the sensor output from the sensor panel 45 of the sensor section, and monitors the depression of the ten keys 41 and the other operation keys of the cell phone terminal 40 (step S304).

When it is discriminated in step S304 that no operation key is depressed, the microcomputer returns to step S301 to repeat a sequence of processes starting at step S301.

When it is discriminated in step S304 that some operation key is depressed, however, the microcomputer discriminates the depressed operation key, and executes a process corresponding to the operation key (step S305).

Next, the microcomputer discriminates whether the hand is moved off the neutral zone or not (step S306). When it is discriminated that the hand is not moved off the neutral zone, the microcomputer returns to step S304 to monitor the depression of any operation key and repeat a sequence of processes starting at step S304.

When it is discriminated in step S306 that the hand is moved off the neutral zone, the microcomputer returns to step S301 to repeat a sequence of processes starting at step S301.

When it is discriminated in step S303 that the height position of the hand is above the neutral zone, the microcomputer determines in which one of the layers K1, K2 and K3 set in the detection space over the sensor panel 45 the hand lies (step S311).

When it is discriminated in step S311 that the hand lies in the layer K1, the microcomputer determines that the ten keys 41 are numerals input keys by referring to the layer information storage section (step S312). When it is discriminated in step S311 that the hand lies in the layer K2, the microcomputer determines that the ten keys 41 are alphabets/symbols input keys by referring to the layer information storage section (step S313). When it is discriminated in step S311 that the hand lies in the layer K3, the microcomputer determines that the ten keys 41 are hiragana input keys by referring to the layer information storage section (step S314).

After step S312, 5313 or 5314, the microcomputer displays the determined character type for the ten keys 41 on the display screen 44 (step S315). Next, the microcomputer discriminates whether or not the SET key 43 is depressed (step S316). When it is discriminated that the SET key 43 is not depressed, the microcomputer returns to step S311 to repeat a sequence of processes starting at step S311.

When it is discriminated that the SET key 43 is depressed, the microcomputer sets the ten keys 41 as the input keys which have been determined upon depression of the SET key 43 (step S317).

When it is discriminated in step S304 that an operation key is depressed after the key setting, and when the depressed operation key is one of the ten keys 41, the microcomputer determines the ten keys 41 as the set input keys, and executes the process of step S305. The set character type for the ten keys 41 is displayed on the display screen 44 to inform the user of the character type of the input keys the current ten keys 41 have.

According to the third embodiment, as apparent from the above, in case of using the operation keys like the ten keys as input keys of plural types, such as character types, the type of the input keys can be changed according to the position of a hand in the space over the operation keys, which is very convenient.

The operational determination on the SET key 43 in step S316 is premised on that the presence of the hand in the space over the ten keys 41 is detected. When the SET key 43 is depressed, the microcomputer monitors the sensor output from the sensor panel 45 of the sensor section and executes the process of step S316 when the sensor output indicates that the detection target (hand in this case) lies in one of the layers K1, K2 and K3.

When the sensor output indicates that the detection target does not lie in any one of the layers K1, K2 and K3 with the SET key 43 depressed, the microcomputer executes the determined process as a decision input other than the process of step S316.

The plural types assigned to the operation keys are not limited to character types. When an operation key is a key to select a function, for example, plural types of functions can be assigned to the key, so that the assigned functions are changed according to the position of a hand in the space.

Although the decision operation is the depression of the SET key 43 in the foregoing description of the third embodiment, a specific behavior of a hand selecting a layer may be set as a decision input. Examples of the decision input are shown in FIGS. 23A and 23B.

Figure 23A:
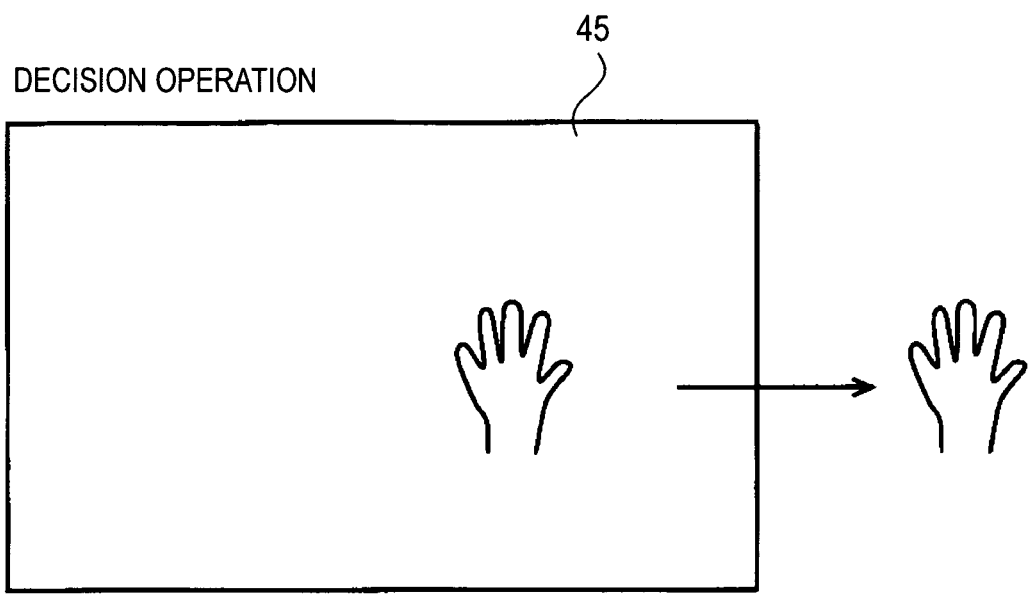
FIGS. 23A and 23B are diagrams used to explain a modification of the another embodiment of the information processing apparatus according to the invention.

The example in FIG. 23A shows that an operation of horizontally moving the hand, present in one layer, off the sensor panel 10 without moving the hand to another layer is a decision operation to select the layer where the hand is present. The micro computer which monitors the sensor output signal from the sensor panel 45 detects this operation as the disappearance of the hand present in one layer without being moved to another layer.

The sensor panel 45 used in this case is the X-Z sensor panel having a plurality of vertical electrodes provided at the electrode layer. If the moving direction of the hand disappearing from the layer is the vertical direction orthogonal to the horizontal direction, the sensor panel 45 in use is the Y-Z sensor panel having a plurality of horizontal electrodes provided at the electrode layer.

Figure 23B:
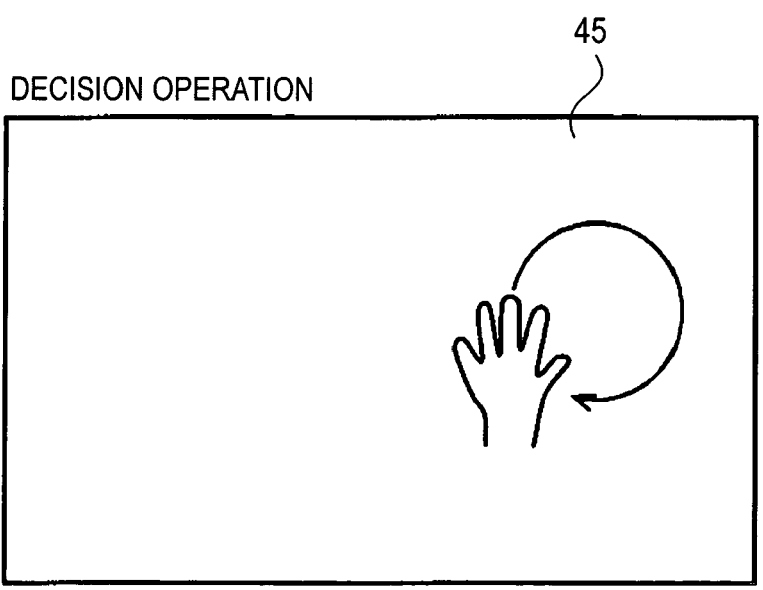

The example in FIG. 23B shows a decision operation which is a predetermined behavior of the hand present in the layer without being moved to another layer, i.e., a predetermined gesture with the hand. In the example in FIG. 23B, a gesture of the hand drawing a circle is the decision operation.

The sensor panel 45 used in this case is the lamination of the X-Z sensor panel having a plurality of vertical electrodes provided at the electrode layer, and the Y-Z sensor panel having a plurality of horizontal electrodes provided at the electrode layer.

As mentioned above, the use of such a laminated sensor panel can allow the microcomputer to also detect movement of a detection target in the x-axial and y-axial directions of the sensor panel 45 from the output signal of the sensor section. Therefore, the microcomputer can detect a predetermined horizontal behavior of a hand present in a layer to discriminate whether or not the behavior is a decision operation.

Although the sensor panel 45 is provided under only the ten keys 41 in the third embodiment, the sensor panel may of course be provided under the whole operational surface of the operation keys including the ten keys 41.

Fourth Embodiment

The fourth embodiment, like the first embodiment, takes the form of an information processing system having an operation input apparatus and a PC. According to the fourth embodiment, at the time of making a three-dimensional (3D) visual chat, an avatar can be moved while chatting, with a hand left on the keyboard and without changing the keyboard of the operation input apparatus to another input section.

In the example to be described below, an avatar is moved using operation keys for movement on the keyboard while making a downward-view operation on a map according to the spatial position of the hand on the screen for displaying the avatar on the map.

Figure 24:
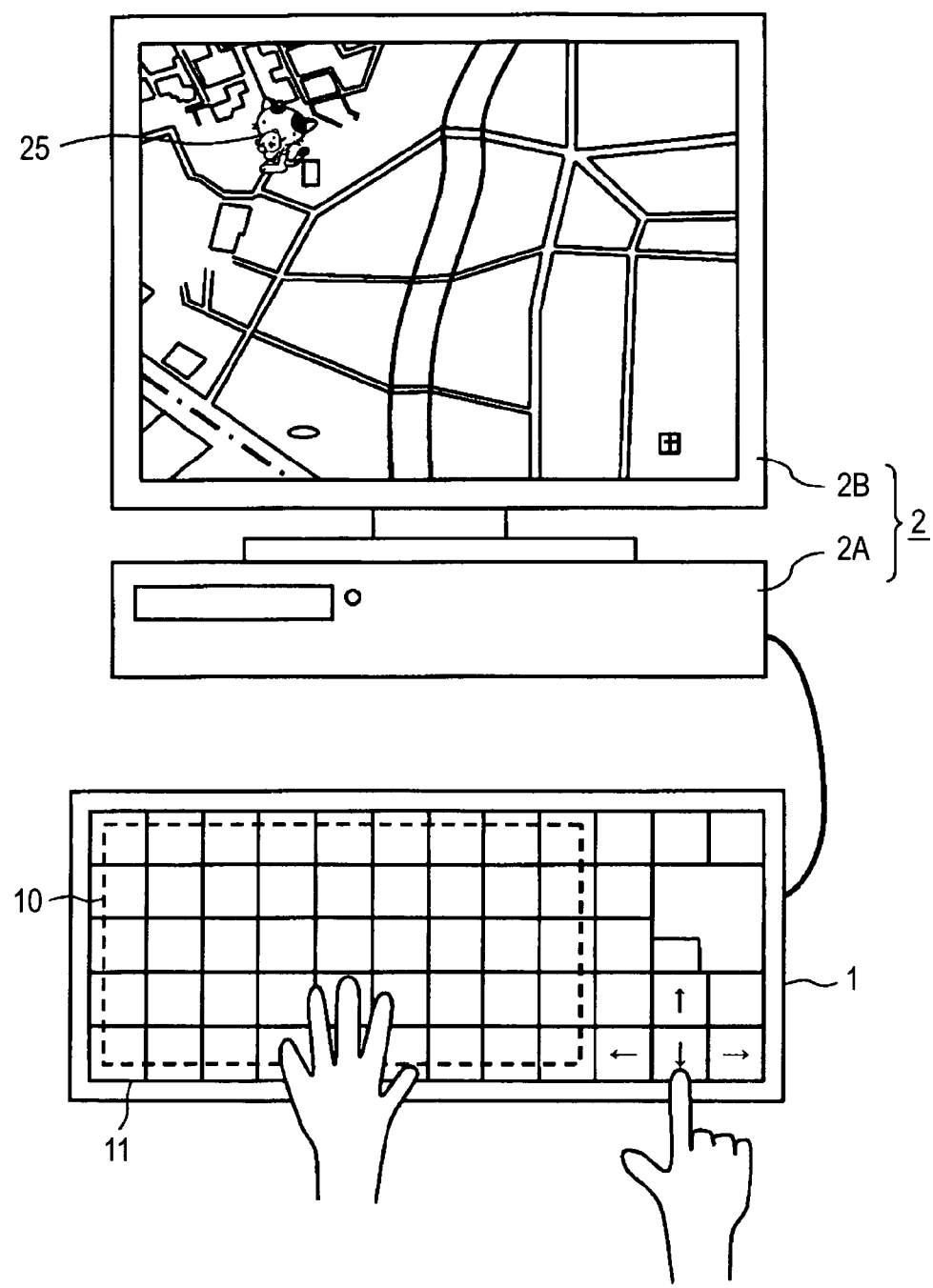
FIG. 24 is a block diagram for explaining an example of the hardware configuration of another embodiment of the information processing system according to the invention.

FIG. 24 is a diagram showing an example of the configuration of the information processing system according to the fourth embodiment. The information processing system, like that of the first embodiment, includes a sensor section 10, an operation input apparatus 1 having a keyboard 11, and a PC 2. The operation input apparatus 1 is connected to a PC body 2A of the PC 2, and a display image is displayed on a display unit 2B connected to the PC body 2A under the control of the PC body 2A.

The operation input apparatus 1 has a configuration similar to the one shown in FIG. 1, and supplies the PC body 2A with a sensor output according to the position of a user's hand in the space over the keyboard 11 as mentioned above.

The PC body 2A according to the embodiment has an application program for visual chatting installed therein, and has a function capable of displaying a 3D map on the display screen.

According to the embodiment, the PC body 2A also has a function of generating and displaying a 3D map on the display screen with the spatial position of the hand to be detected from the sensor output from the sensor section 10 as a viewpoint position.

According to the embodiment, a key operation output can always be made with the keyboard 11 distance in a neutral zone. Therefore, a 3D map viewed downward from the position of the hand in the space over the neutral zone above the keyboard 11 can be displayed on the display screen, and an avatar can be moved on the map by operating the movement operation keys of the keyboard 11.

For example, an avatar 25 on the display screen of the display unit 2B can be moved by placing the left hand in the space over the neutral zone over the keyboard 11 and operating the UP/DOWN/RIGHT/LEFT keys with a finger of the right hand as indicated by the hands over the operation input apparatus 1 in FIG. 24. Characters can be input using the operation keys on the keyboard 11.

Next, assignment of layers in the space over the operation input apparatus 1 according to the fourth embodiment will be described referring to FIGS. 25 and 26.

Figures 25, 26:
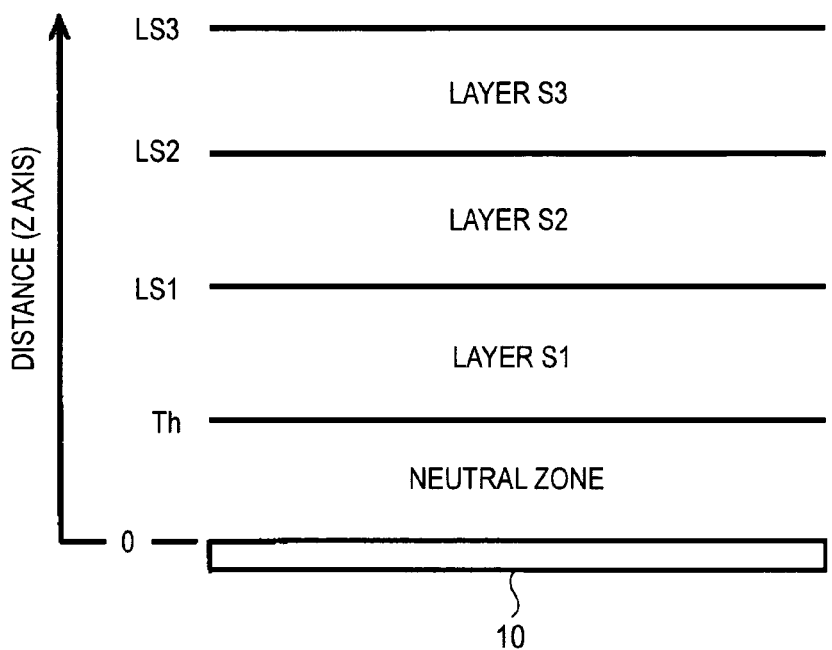
FIG. 25 is a diagram for explaining an example of setting a layer according to a distance to a detection target from a sensor in an operation input apparatus in the another embodiment of the information processing system according to the invention.
FIG. 26 is a diagram for explaining the correlation between layers according to distances to a detection target from the sensor in the operation input apparatus in the another embodiment of the information processing system according to the invention, and functions to be assigned to the layers.

According to the fourth embodiment, three layers S1, S2 and S3 as shown in FIG. 25 are assigned to the space over the sensor panel 10P of the sensor section 10. The space extending from the surface of the sensor panel 10P by the distance Th is also set as a neutral zone as per the fourth embodiment.

The three layers S1, S2 and S3 are assigned to the space over the neutral zone.

In this case, as shown in FIG. 25, with the surface position of the sensor panel 10P being set as the origin position 0 of the z axis, the z-directional distances to be the boundaries of the three layers S1, S2 and S3 are set to LS1, LS2 and LS3. Therefore, the distance ranges of the layers S1, S2 and S3 are set as Th<layer S1≦LS1, LS1<layer S2≦LS2, LS2<layer S3≦LS3.

The viewpoints of a 3D map are respectively assigned to the three layers S1, S2 and S3 as shown in FIG. 26. FIG. 26 shows the stored contents of the layer information storage section provided in the PC body 2A.

Specifically, the player's viewpoint is assigned to the layer S1 as shown in FIG. 26. When the user's hand is located in the layer S1, therefore, a map viewed from the player's viewpoint is displayed on the display screen.

A partial map downward viewpoint from an intermediate position (intermediate height) is assigned to the layer S2. When the user's hand is located in the layer S2, therefore, a 3D map which is viewed from the intermediate height and hides a part of the entire area is displayed on the display screen.

A general map downward viewpoint from the sky is assigned to the layer S3. When the user's hand is located in the layer S3, therefore, a 3D map which is viewed from the sky and shows the entire area is displayed on the display screen.

<Example of the Processing Operation of the Fourth Embodiment>

Figure 27:
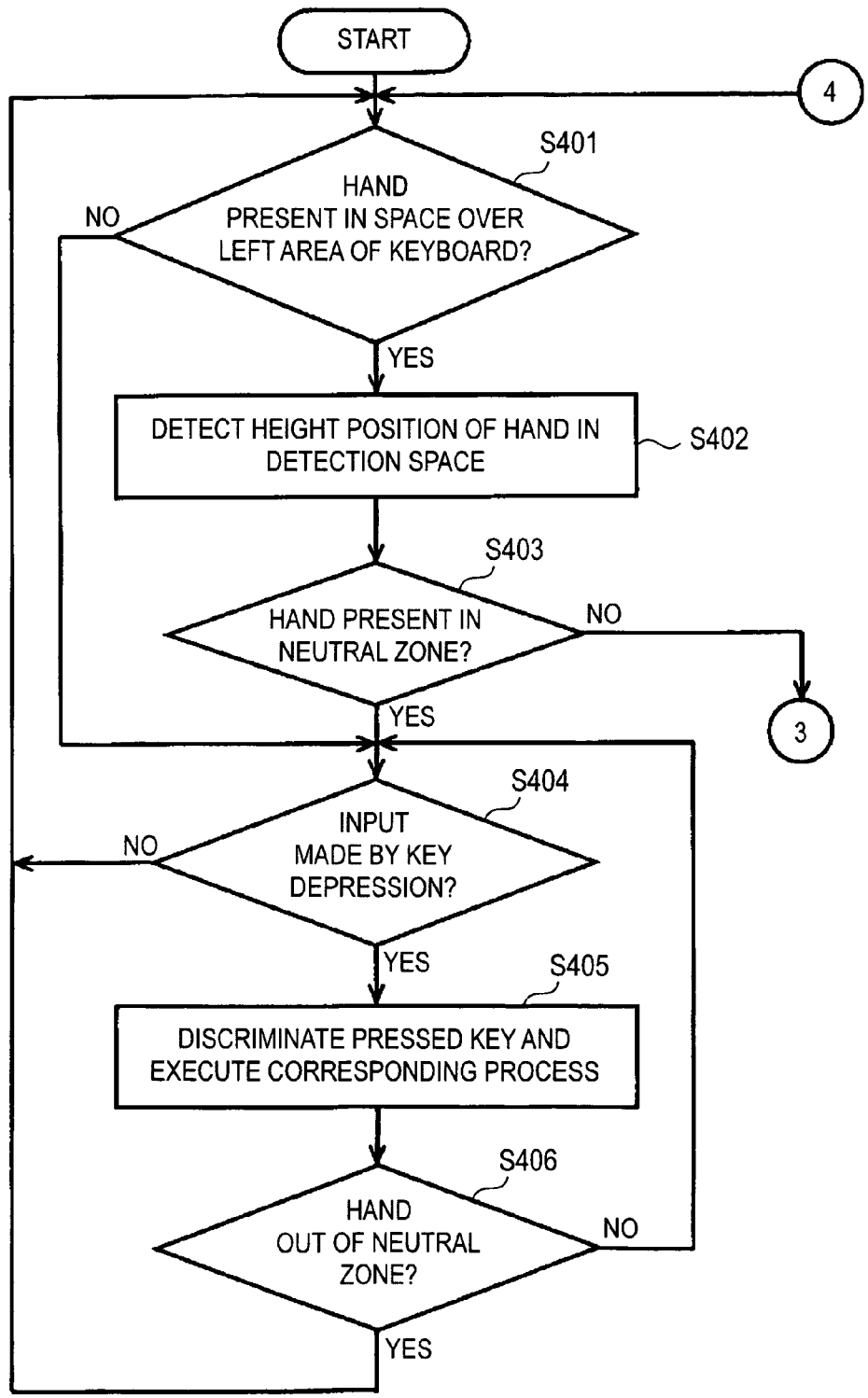
FIG. 27 is a diagram illustrating a part of a flowchart for explaining an example of the processing operation of the another embodiment of the information processing system according to the invention.
Figure 28:
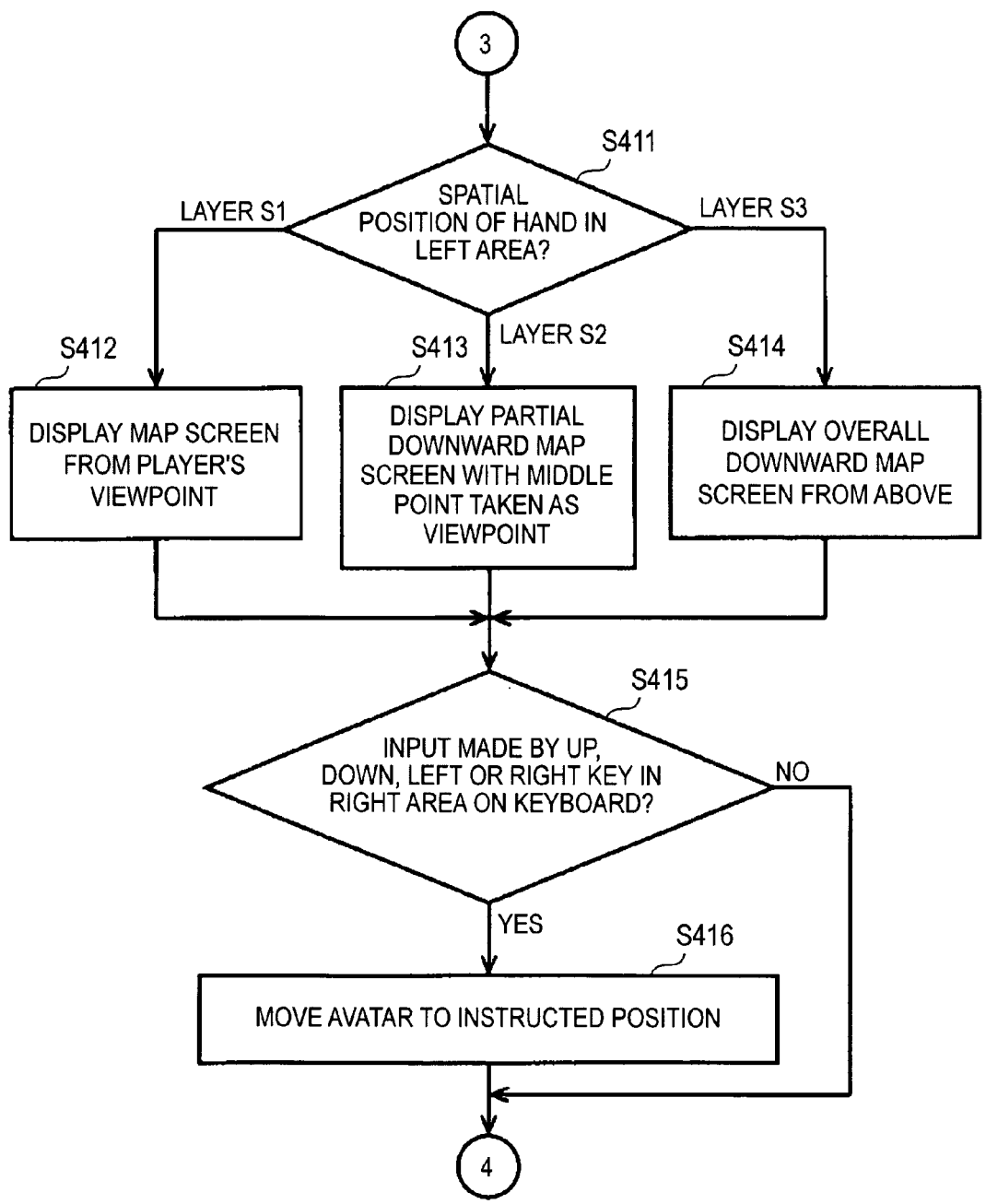
FIG. 28 is a diagram showing a part of the flowchart for explaining the example of the processing operation of the another embodiment of the information processing system according to the invention.

FIGS. 27 and 28 are flowcharts illustrating an example of the processing operation of the PC body 2A in the information processing system according to the fourth embodiment in response to an operation input made by the user. The CPU 201 of the PC body 2A executes the processes of the individual steps in FIGS. 27 and 28 according to the program stored in the RAM 202.

First, the CPU 201 discriminates whether the presence of a hand in the detection space of the hand as a detection target above the key layout surface of the keyboard 11 of the operation input apparatus 1 (step S401). When the presence of the hand in the detection space is not detected in the step S401, the CPU 201 repeats the step S401.

When it is discriminated in step S401 that the presence of the hand in the detection space is detected, the CPU 201 detects the height position of the hand in the detection space (distance from the surface of the sensor panel 10P) (step S402).

Then, the CPU 201 discriminates whether the detected height position of the hand or the detected distance from the surface of the sensor panel 10P lies in the neutral zone or not depending on whether the height position of the hand is equal to or greater than the distance Th (step S403).

When it is discriminated that the hand lies in the neutral zone, the CPU 201 neglects and invalidates the sensor output from the sensor panel 10P of the sensor section 10, and monitors the depression of the operation keys 11K of the keyboard 11 (step S404).

When it is discriminated in step S404 that no operation key 11K is depressed, the CPU 201 returns to step S401 to repeat a sequence of processes starting at step S401.

When it is discriminated in step S404 that some operation key is depressed, however, the CPU 201 discriminates the depressed operation key, and executes a process corresponding to the operation key (step S405).

Next, the CPU 201 discriminates whether the hand is moved off the neutral zone or not (step S406). When it is discriminated that the hand is not moved off the neutral zone, the CPU 201 returns to step S404 to monitor the depression of any operation key and repeat a sequence of processes starting at step S404.

When it is discriminated in step S406 that the hand is moved off the neutral zone, the CPU 201 returns to step S401 to repeat a sequence of processes starting at step S401.

When it is discriminated in step S403 that the height position of the hand is above the neutral zone, the CPU 201 determines in which one of the layers S1, S2 and S3 set in the detection space over the sensor panel 10P the hand lies (step S411).

When it is discriminated in step S411 that the hand lies in the layer S1, the CPU 201 writes and generates a map image viewed from the player's viewpoint by referring to the layer information storage section, and displays the map image on the display screen of the display unit 2B (step S412).

When it is discriminated in step S411 that the hand lies in the layer S2, the CPU 201 writes and generates a partial downward map image viewed from the intermediate position by referring to the layer information storage section, and displays the map image on the display screen of the display unit 2B (step S413).

When it is discriminated in step S411 that the hand lies in the layer S3, the CPU 201 writes and generates a general downward map image viewed from the sky by referring to the layer information storage section, and displays the map image on the display screen of the display unit 2B (step S414).

After step S412, 5413 or 5414, the CPU 201 discriminates whether the UP/DOWN/RIGHT/LEFT key located in the right-hand area of the keyboard 11 is depressed or not (step S415). When it is discriminated that the UP/DOWN/RIGHT/LEFT key is depressed, the CPU 201 moves the avatar displayed on the display screen to the instructed position (step S416). Thereafter, the CPU 201 returns to step S401 to repeat a sequence of processes starting at step S401.

When it is discriminated in step S415 that the UP/DOWN/RIGHT/LEFT key is not depressed, the CPU 201 returns to step S401 to repeat a sequence of processes starting at step S401.

Because the sensor section 10 has only to detect the height position of the hand according to the fourth embodiment, it is not necessary to use the lamination of the X-Z sensor panel and the Y-Z sensor panel, and can has only one of the sensor panels.

Other Embodiments and Modifications

Although the key operation section is assumed to be provided with a plurality of operation keys, such as a keyboard or ten keys, in the foregoing embodiment, the invention can of course be adapted to a case where the key operation section has a single operation key.

Although the operation keys have been described as press button type keys, the operation keys may be seesaw type keys or slide type keys. In addition, the operation keys may be displayed on the display screen and detected through a touch panel.

The function control according to the spatial coordinates of the user's hand over the key operation section is not limited to the one described in the foregoing example. For example, the function control can be adapted to such a function that with the sensor panel disposed under the keyboard of a musical instrument like a piano, when a finger is placed over a key, a tone to be generated when the key is pressed is displayed on the display screen to inform the user of the tone of the key to be stroked beforehand. The operation input apparatus according to the foregoing embodiment may be provided with the function of informing the user of what key is to be operated beforehand.

In the foregoing descriptions of the embodiments, holes where operators to transmit a depressing operation to the printed wiring board are inserted are provided in the sensor panel in case of using depression type operation keys.

When the sensor panel is configured to be a flexible panel and the printed wiring board is provided with the depression type switches, so that when an operation key is depressed, the biasing of the sensor panel sets on a depression type switch corresponding to the depressed operation key. In this case, holes where the operators are to be inserted need not be formed in the sensor panel.

Although the sensor converts a capacitance corresponding to a spatial distance to a detection target into an oscillation frequency which is counted by the frequency counter to be output in the foregoing embodiments, the scheme of acquiring the sensor output corresponding to the capacitance is not limited to this type. For example, a frequency-voltage converter may be used to provide an output voltage corresponding to an oscillation frequency as a sensor output as disclosed in Patent Document 1.

In addition, conversion of a capacitance corresponding to a spatial distance to a detection target into a voltage, the so-called charged transfer scheme, may be used instead. Further, the so-called projected capacitor scheme may be used to detect a capacitance corresponding to a spatial distance to a detection target.

Although wire electrodes are used as the electrodes of the sensor in the foregoing embodiments, point electrodes may be arranged at intersections between the wire electrodes in the horizontal direction and the wire electrodes in the vertical direction. In this case, a capacitance between each point electrode and the ground is detected, so that the wire electrodes in the horizontal direction and the wire electrodes in the vertical direction are sequentially changed electrode by electrode to detect the capacitances. To provide the adequate detection sensitivity according to the distance to be detected, the electrodes to be detected are thinned or some electrodes are skipped according to the distance to be detected as in the case of using wire electrodes.

While the foregoing embodiments employ the sensor that can detect a spatial distance to a detection target based on the capacitance, which is not restrictive, any sensor capable of detecting a spatial distance to a detection can be used as well.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
a key operation section that has one or more operation keys arranged planarly, and outputs a key operation output corresponding to an operation of an operation key;
a sensor that outputs a detection output corresponding to a distance of a detection target, spatially separated from a layout surface of the operation key of the key operation section, from the layout surface;
a detection section that detects the distance of the detection target from the layout surface from the detection output from the sensor; and
a control section that validates only the key operation output corresponding to the operation of the operation key and invalidates the detection output of the sensor when the distance detected by the detection section is a non-zero distance and is less than a predetermined non-zero distance away from the operation key, and executes a control function according to the distance detected by the detection section when the detected distance is equal to or greater than the predetermined distance.

2. The information processing apparatus according to claim 1, wherein the sensor has a plurality of electrodes, and detects a distance between a plane containing the plurality of electrodes and the detection target spatially separated from the plane from a capacitance corresponding to the distance.

3. The information processing apparatus according to claim 1 or 2, wherein the predetermined distance is set to a value which invalidates a detection output from the sensor corresponding to a position of a hand of a user which is the detection target when the user performs an input operation with the operation key of the key operation section.

4. The information processing apparatus according to claim 1 or 2, further comprising:
a storage section that stores information on boundary values of a plurality of layers to which different functions are respectively assigned, and which are set according to different distances equal to or greater than the predetermined distance; and
a determination section that determines in which one of the plurality of layers the detection target is positioned, from the boundary values of the plurality of layers in the storage section and the distance detected by the detection section,
wherein the control section executes a process about the function assigned to that layer where the detection target is positioned, based on a determination result from the determination section.

5. The information processing apparatus according to claim 1 or 2, wherein the sensor has a plurality of electrodes, and the detection output corresponding to a distance between a plane containing the plurality of electrodes and the detection target spatially separated from the plane is generated from capacitances of the plurality of electrodes corresponding to the distance.

6. The information processing apparatus according to claim 1 or 2, wherein the sensor is capable of outputting a detection output according to a position of the detection target in a direction intersecting a direction of the distance,
the detection section detects the position of the detection target in the direction intersecting the direction of the distance from the detection output from the sensor, and
the control section performs a process for the control function based on the position of the detection target detected by the detection section.

7. The information processing apparatus according to claim 4, wherein the sensor is capable of outputting a detection output according to a position of the detection target in the determined layer which intersects a direction of the distance,
the detection section detects the position of the detection target in the direction intersecting the direction of the distance from the detection output from the sensor, and
the control section detects a predetermined locus of the detection target in the determined layer as a decision input in controlling the function, based on the position of the detection target detected by the detection section.

8. The information processing apparatus according to claim 1 or 2, wherein the control section detects a key operation output of a predetermined key operation on the key operation section as a decision input in the control function according to the distance detected by the detection section.

9. The information processing apparatus according to claim 1 or 2, wherein when the distance detected by the detection section is equal to or greater than the predetermined distance, the control section performs the control function according to the distance detected by the detection section, and detects a key operation output from the key operation section as related input to the control function.

10. The information processing apparatus according to claim 1 or 2, wherein the sensor is provided between the key operation section and a wiring board which detects an operation of the operation key, thereby providing a single operation input section.

11. The information processing apparatus according to claim 1 or 2, wherein the information processing apparatus is a personal computer.

12. An information processing method for an information processing apparatus including a key operation section which has one or more operation keys arranged planarly, and outputs a key operation output corresponding to an operation of an operation key, a sensor, a detection section and a control section, the method comprising the steps of:
outputting by the sensor a detection output corresponding to a distance of a detection target, spatially separated from a layout surface of the operation key of the key operation section, from the layout surface;

detecting by the detecting section the distance of the detection target from the layout surface from the detection output from the sensor; and controlling by the control section to validate only the key operation output corresponding to the operation of the operation key and invalidate the detection output of the sensor when the distance detected in the detection step is a non-zero distance and is less than a predetermined non-zero distance away from the operation key, and execute a control function according to the distance detected by the detection section when the detected distance is equal to or greater than the predetermined distance.

13. An information processing system comprising:

an operation input device; and an information processing apparatus which receives an output signal therefrom, the operation input apparatus having a key operation section that has one or more operation keys arranged planarly, and outputs a key operation output corresponding to an operation of an operation key; and a sensor that outputs a detection output corresponding to a distance of a detection target, spatially separated from a layout surface of the operation key of the key operation section, from the layout surface, the information processing apparatus having a detection section that detects the distance of the detection target from the layout surface from the detection output from the sensor; and a control section that validates only the key operation output corresponding to the operation of the operation key and invalidates the detection output of the sensor when the distance detected by the detection section is a non-zero distance and is less than a predetermined non-zero distance away from the operation key, and executes a control function according to the distance detected by the detection section when the detected distance is equal to or greater than the predetermined distance.

14. An information processing program for allowing a computer included in an information processing apparatus which receives a detection output from an operation input section having a key operation section that has one or more operation keys arranged planarly, and outputs a key operation output corresponding to an operation of an operation key, and a sensor that outputs a detection output corresponding to a distance of a detection target, spatially separated from a layout surface of the operation key of the key operation section, from the layout surface to function as:

a detection section that detects the distance of the detection target from the layout surface from the detection output from the sensor; and a control section that validates only the key operation output corresponding to the operation of the operation key and invalidates the detection output of the sensor when the distance detected by the detection section is a non-zero distance and is less than a predetermined non-zero distance away from the operation key, and executes a control function according to the distance detected by the detection section when the detected distance is equal to or greater than the predetermined distance.

\* \* \* \* \*